United States Patent
Seok et al.

(10) Patent No.: US 11,754,683 B2
(45) Date of Patent: Sep. 12, 2023

(54) PSEUDO MONOSTATIC LIDAR WITH TWO-DIMENSIONAL SILICON PHOTONIC MEMS SWITCH ARRAY

(71) Applicant: nEYE Systems, Inc., Berkeley, CA (US)

(72) Inventors: Tae Joon Seok, Albany, CA (US); Ming Chiang A. Wu, Moraga, CA (US)

(73) Assignee: nEYE Systems, Inc., Berkeley, CA (US)

(*) Notice: Subject to any disclaimer, the term of this patent is extended or adjusted under 35 U.S.C. 154(b) by 0 days.

(21) Appl. No.: 17/687,372

(22) Filed: Mar. 4, 2022

(65) Prior Publication Data
US 2022/0357429 A1    Nov. 10, 2022

Related U.S. Application Data

(60) Provisional application No. 63/186,748, filed on May 10, 2021.

(51) Int. Cl.
*G01S 7/481*    (2006.01)
*G01S 17/89*    (2020.01)
(Continued)

(52) U.S. Cl.
CPC ........ *G01S 7/4817* (2013.01); *G01S 7/4811* (2013.01); *G01S 7/4818* (2013.01); *G01S 17/42* (2013.01); *G01S 17/89* (2013.01); *G01S 17/931* (2020.01)

(58) Field of Classification Search
CPC .... G01S 7/4817; G01S 7/4811; G01S 7/4818; G01S 17/42; G01S 17/89; G01S 17/931
See application file for complete search history.

(56) References Cited

U.S. PATENT DOCUMENTS

| | | |
|---|---|---|
| 5,543,805 A | 8/1996 | Thaniyavarn |
| 5,761,352 A | 6/1998 | Kitajima et al. |

(Continued)

FOREIGN PATENT DOCUMENTS

| | | |
|---|---|---|
| CN | 1656721 A | 8/2005 |
| CN | 102576130 A | 7/2012 |

(Continued)

OTHER PUBLICATIONS

English version of DE-102018221875-A1 (Year: 2020).*
(Continued)

*Primary Examiner* — Yuqing Xiao
*Assistant Examiner* — Jempson Noel
(74) *Attorney, Agent, or Firm* — Shay Glenn LLP

(57) ABSTRACT

The present disclosure is directed to imaging LiDARs with separate transmit (Tx) and receive (Rx) optical antennas fed by different optical waveguides. This pair of optical antennas can be activated at the same time through a dual-channel optical switch network, with the Tx antenna connected to a laser source and the Rx antenna connected to a receiver. The Tx and Rx antennas can be positioned adjacent to each other, so they point to approximately the same far-field angle. No optical alignment between the Tx and Rx is necessary. This LiDAR configuration, referred to herein as pseudo-monostatic LiDAR, eliminates spurious reflections and increases the dynamic range of the LiDAR.

21 Claims, 22 Drawing Sheets

(51) Int. Cl.
*G01S 17/42* (2006.01)
*G01S 17/931* (2020.01)

(56) References Cited

U.S. PATENT DOCUMENTS

| | | | |
|---|---|---|---|
| 6,028,973 | A | 2/2000 | Schienle et al. |
| 6,160,927 | A | 12/2000 | Leclerc et al. |
| 6,218,667 | B1 | 4/2001 | Nonaka et al. |
| 6,522,427 | B1 | 2/2003 | Bhattacharjya et al. |
| 6,777,767 | B2 | 8/2004 | Badehi |
| 6,842,563 | B2 | 1/2005 | Zhang et al. |
| 6,944,361 | B2 | 9/2005 | Xue et al. |
| 6,970,619 | B2 | 11/2005 | Baumann et al. |
| 7,116,856 | B2 | 10/2006 | Iio et al. |
| 8,891,914 | B2 | 11/2014 | Ticknor et al. |
| 8,938,142 | B2 | 1/2015 | Shastri et al. |
| 9,013,790 | B1 | 4/2015 | Kazmierski et al. |
| 9,405,066 | B2 | 8/2016 | Mahgerefteh et al. |
| 9,800,332 | B2 | 10/2017 | Chalfant et al. |
| 10,061,085 | B2 | 8/2018 | Wu et al. |
| 10,466,423 | B2 | 11/2019 | Spector et al. |
| 10,473,862 | B2 | 11/2019 | Spector et al. |
| 10,715,887 | B2 | 7/2020 | Seok et al. |
| 10,761,272 | B2 | 9/2020 | Hosseini et al. |
| 10,823,913 | B1 | 11/2020 | Moebius et al. |
| 11,061,234 | B1 | 7/2021 | Zhu et al. |
| 2002/0034372 | A1 | 3/2002 | Alibert et al. |
| 2002/0186918 | A1 | 12/2002 | Burroughs |
| 2002/0186919 | A1 | 12/2002 | Pepper |
| 2003/0010827 | A1 | 1/2003 | Hilton et al. |
| 2003/0107793 | A1 | 6/2003 | Capps |
| 2003/0108274 | A1 | 6/2003 | Haronian |
| 2003/0108290 | A1 | 6/2003 | Zhang et al. |
| 2003/0174934 | A1 | 9/2003 | Ishii et al. |
| 2003/0198259 | A1 | 10/2003 | Zhang et al. |
| 2003/0231821 | A1 | 12/2003 | Clarke et al. |
| 2006/0061753 | A1 | 3/2006 | Harris et al. |
| 2007/0030570 | A1 | 2/2007 | Jacobowitz et al. |
| 2007/0258681 | A1 | 11/2007 | Takabayashi et al. |
| 2009/0220228 | A1 | 9/2009 | Popovic |
| 2012/0105944 | A1 | 5/2012 | Wang et al. |
| 2012/0170111 | A1 | 7/2012 | Doerr et al. |
| 2012/0314037 | A1 | 12/2012 | Nehmadi et al. |
| 2013/0336664 | A1 | 12/2013 | Mack et al. |
| 2014/0192394 | A1* | 7/2014 | Sun ................. G02F 1/0147 359/238 |
| 2014/0212104 | A1 | 7/2014 | Cho et al. |
| 2014/0347733 | A1 | 11/2014 | Stewart et al. |
| 2014/0354856 | A1 | 12/2014 | Zhou et al. |
| 2015/0346340 | A1 | 12/2015 | Yaacobi et al. |
| 2016/0170287 | A1 | 6/2016 | Bitauld et al. |
| 2016/0359568 | A1 | 12/2016 | De Dobbelaere et al. |
| 2017/0186166 | A1 | 6/2017 | Grunnet-Jepsen et al. |
| 2017/0242161 | A1 | 8/2017 | Zhang et al. |
| 2017/0374244 | A1 | 12/2017 | Swaminathan et al. |
| 2018/0088255 | A1 | 3/2018 | Sakai et al. |
| 2018/0088439 | A1* | 3/2018 | Inoue ................. G02F 1/2955 |
| 2018/0224709 | A1 | 8/2018 | Inada et al. |
| 2018/0267250 | A1* | 9/2018 | Hosseini ............ H04B 10/27 |
| 2019/0170937 | A1 | 1/2019 | Menezo et al. |
| 2020/0150241 | A1* | 5/2020 | Byrnes ............... G01S 7/4812 |
| 2020/0209361 | A1 | 7/2020 | Maier et al. |
| 2020/0284883 | A1 | 9/2020 | Ferreira et al. |
| 2020/0303896 | A1 | 9/2020 | Ohta et al. |
| 2020/0333131 | A1 | 10/2020 | Guo et al. |
| 2021/0116655 | A1* | 4/2021 | Grieco ................ G02B 6/4215 |
| 2021/0116778 | A1 | 4/2021 | Zhang et al. |
| 2021/0181310 | A1* | 6/2021 | Lu ..................... G01S 17/42 |
| 2021/0191046 | A1 | 6/2021 | Seok et al. |
| 2021/0316756 | A1* | 10/2021 | Davydenko ........... G06V 20/58 |
| 2021/0359396 | A1* | 11/2021 | Mattheijssen ......... H04W 36/32 |
| 2021/0382142 | A1 | 12/2021 | Rogers et al. |
| 2022/0003842 | A1* | 1/2022 | Wang ................. G01S 7/4814 |
| 2022/0075044 | A1* | 3/2022 | Michaels .............. G01S 7/4917 |
| 2022/0214503 | A1 | 7/2022 | Waldren et al. |
| 2022/0236384 | A1 | 7/2022 | Sutton et al. |
| 2022/0291461 | A1 | 9/2022 | Elsinger et al. |

FOREIGN PATENT DOCUMENTS

| | | | | |
|---|---|---|---|---|
| DE | 102018221875 A1 | * | 6/2020 | |
| EP | 3635460 A1 | | 4/2020 | |
| IN | 2020/017021228 A | | 8/2020 | |
| JP | S56-48603 A | | 5/1981 | |
| JP | 09-005799 A | | 1/1997 | |
| JP | 2018049223 A | | 3/2018 | |
| KR | 10-20140138107 A | | 12/2014 | |
| KR | 10-20180056783 A | | 5/2018 | |
| WO | WO-0052763 A1 | * | 9/2000 | ......... H01L 31/0236 |
| WO | WO2014089454 A2 | | 6/2014 | |
| WO | WO2017065971 A1 | | 4/2017 | |
| WO | WO2017/132568 A1 | | 8/2017 | |
| WO | WO2018/111316 A1 | | 6/2018 | |
| WO | WO-2018160729 A2 | * | 9/2018 | ............. G01S 17/18 |
| WO | WO-2020205450 A1 | * | 10/2020 | ............. G01S 17/34 |
| WO | WO2022/011701 A1 | | 1/2022 | |

OTHER PUBLICATIONS

Akihama et al.; Single and multiple optical switches that use freestanding silicon nanowire waveguide couplers; Light Science and Applications; 1(6); e16; DOI:10.1038/ISA_2012.16; 8 pages: ; Jun. 2012.

Binkert et al.; Optical high radix switch design; Micro IEEE; 32(3); pp. 100-109; Apr. 2012.

Celo et al.; 32X32 silicon photonic switch; IEEE In 2016 21st OptoElectronics and Communication Conference (OECC); pp. 1-3; Jul. 2016.

Chen et al.; Compact, low-loss and low-power 8x8 broadband silicon optical switch; Optics Express; 20(17); pp. 18977-18985; 9 pages; Aug. 2012.

Farrington et al.; Helios: a hybrid electrical/optical switch architecture for modular data centers; Proceedings of the ACM SIGCOMM 2010 Conference; 41(4); pp. 339-350; Aug. 2010.

Han et al.; 50x50 polarization-insensitive silicon photonic MEMS switches: design and experiment: In ECOC 2016 Post Deadline Paper, 42nd European Conference on Optical Communication; pp. 1-3; Sep. 2016.

Han et al.; Large-scale silicon photonic switches with movable directional couplers; Optica; 2(4); pp. 370-375; Apr. 2015.

Han et al.; Monolithic 50x50 MEMS silicon photonic switches with microsecond response time; Optical Fiber Communication Conference, Optical Society of America; pp. M2K-2, 3 pages; Mar. 2014.

Inoue et al.; An optical scanner based on beam switching method fabricated on silicon photonics circuit; Proceedings of SPIE; Laser radar Technology and Application XXIII; Event SPIE Defense + Security, Orlando, Florida; vol. 10636; doi 10.117/12.2309304; 7 pages; May 2018.

Khope et al.; Elastic WDM crossbar switch for data centers; IEEE Optical Interconnects Conference (OI); pp. 48-49; May 2016.

Kim et al.; 1100x1100 port MEMS-based optical crossconneect with 4-dB maximum loss; IEEE Photonics Technolgy Letters Leters; 15(11); pp. 1537-1539; Oct. 2003.

Kwon et al.; 128x128 silicon photonic MEMS switch with scalable row/column addressing; CLEO Sciecnce and Innovations, Optical Society of America; pp. SF1A-4; 2 pages; May 2018.

Lee et al.; Monolithic silicon integration of scaled photonic switch fabrics, CMOS logic, and device driver circuits; journal of Lightwave Technology; 32(4); pp. 743-751; Aug. 2013.

Liu et al.; Circuit switching under the radar with REACToR; in 11th USENIX Symposium on network Systems Design and Implementation (NSDI 14); pp. 1-15; (the year of publication is sufficiently earlier than the effective U.S filing date and any foreign priority date so that the particular month of publication is not in issue) 2014.

Nakamura et al.; High extinction ratio optical switching independently of temperature with silicon photonic 1x8 switch; Optical Fiber Communication Conference, Optical Society of America; pp. OTu2I-3); 3 pages; Mar. 2012.

(56) References Cited

OTHER PUBLICATIONS

Porter et al.; Integrating microsecond circuit switching into the data center; in ACM SIGCOMM Computer Commuinication Review; 43(4); pp. 447-458; Aug. 2013.
Rumley et al.; Impact of photonic switch radix on realizing optical interconnection networks for exascale systems; In IEEE Optical Interconnects Conference; pp. 98-99; May 2014.
Seok; Large scale broadband digital silicon photonic switches with vertical adiabatic couplers; Optica; 3(1); pp. 64-70; Jan. 2016.
Sun et al.; Large scale silicon photonic circuits for optical phased arrays; IEEE Journal of Selected Topics In Quantum Electronics; 20(4); pp. 264-278; 15 pages; Nov. 2013.
Suzuki et al.; Ultra-compact 8x8 strictly-non-blocking si-wire PILOSS switch; Optics Express; 22(4); pp. 3887-3894; 8 pages; Feb. 2014.
Tanizawa et al.; 32x32 Strictly non-blocking si-wire optical switch on ultra-small die of 11x25mm92; Optical Fiber Communication Conference; pp. M2B-5; 3 pages; Mar. 2015.
Tanizawa et al.; 4x4 Si-wire optical path switch with off-chip polarization diversity; IEEE Opto-Electronics and Communications Conference (OECC); pp. 1-3; Jun. 2015.
Tanizawa et al.; Non-duplicate polarization-diversity 8x8 si-wire PILOSS switch integrated with polarization splitter-rotators; Optics Express; 25(10); pp. 10885-10892; May 2017.
Tanizawa et al.; Novel polarization diversity without switch duplication of a Si-wire Piloss optical switch; Optiics Express; 24(7); pp. 6861-6868; DOI:10.1364/OE.24.006861, 8 pages; Apr. 2016.
Tanizawa et al.; Silicon photonic 32x32 strictly-non-blocking blade switch and its full path characterization; IEEE 21st OptoElectronics and Communications Conference (OECC); pp. 1-3; Jul. 2016.
Vahdat et al.; The emerging optical data center; Optical Fiber Communication Conference; Optical Society of America; p. OTuH2; 3 pages; Mar. 2011.
Yun et al.; 2x2 adiabatic 3-dB coupler on silicon-on-insulator rib waveguides; Photonics North, SPIE; vol. 8915; pp. 251-256; 6 pages; Oct. 2013.
Zhang et al; A 20x20 focal plane switch array for optical beam steering; IEEE 2020 Conference on Lasers and Electro-Optics (CLEO); 2 pages; May 2020.
Glaser et al.; Multiple lenslet array imagers and correlators; In 10th Meeting on Optical Engineering in Israel; SPIE; vol. 3110; pp. 706-720; Sep. 22, 1997.
Edmund Optics; Lens spacers, shims, and focal extenders; retrieved from the internet (https://www.edmundoptics.com/knowledge-center/application-notes/imaging/lens-spacers-shims-and-focal-length-extenders/) 3 pages; on Sep. 28. 2022.

* cited by examiner

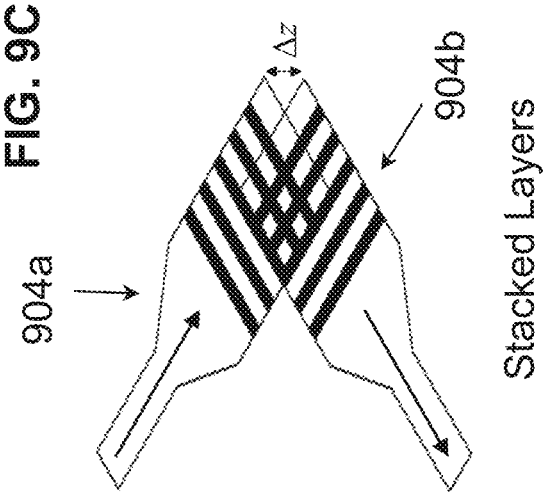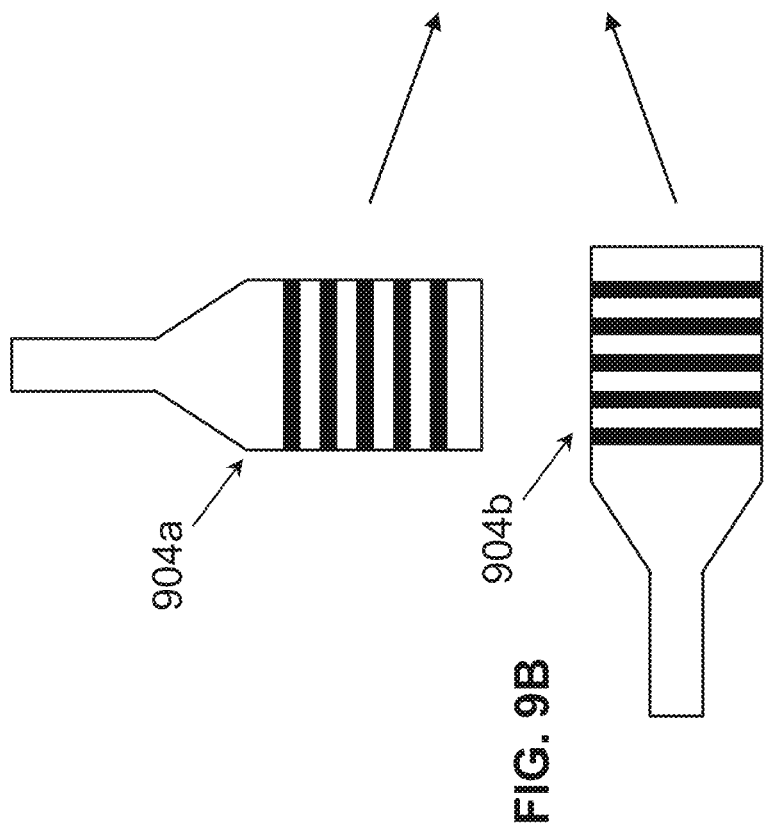

PSEUDO MONOSTATIC LIDAR WITH TWO-DIMENSIONAL SILICON PHOTONIC MEMS SWITCH ARRAY

CROSS REFERENCE TO RELATED APPLICATIONS

This patent application claims priority to U.S. Provisional Patent Application No. 63/186,748 filed May 10, 2021, and titled "PSEUDO MONOSTATIC LIDAR WITH TWO-DIMENSIONAL SILICON PHOTONIC MEMS SWITCH ARRAY," herein incorporated by reference in its entirety.

FIELD

The present disclosure details novel LiDAR systems and methods. More specifically, this disclosure is directed to imaging LiDARs with separate transmit (Tx) and receive (Rx) optical antennas fed by different optical waveguides.

BACKGROUND

Light detection and ranging (LiDAR) is widely used in autonomous vehicles and portable devices such as smartphones and tablets. Solid state LiDARs are particularly attractive because they are conducive to miniaturization and mass production. US Patent Pub. No. 2021/0116778 teaches a beamsteering system consisting of a programmable array of vertical couplers (also called optical antennas) located at the focal plane of an imaging lens. Optical signal can be delivered to any selected optical antenna through a programmable optical network consisting of MEMS (micro-electro-mechanical system)-actuated waveguide switches. Compared with conventional thermo-optic or electro-optic switches, the MEMS switches offer lower insertion loss, lower crosstalk, broadband operation, and digital actuation. High density arrays of programmable optical antennas can be integrated on single chips for high resolution imaging LiDARs, thanks to their small footprint.

Previous work used the same optical antenna to transmit the interrogating optical beam and receive the optical signal reflected from the target. A drawback of this architecture is that any residue reflections from the optical antenna and the shared optical path will be mixed with the received optical signals. The spurious reflections degrade the signal-to-noise ratio and could saturate the amplifiers in the receiver, preventing the LiDAR from seeing far-away targets or targets with low reflectivity.

SUMMARY OF THE DISCLOSURE

A pseudo-monostatic imaging LiDAR system is provided, comprising a lens, at least one light emitter, at least one light detector, a plurality of paired optical antennas each comprising a transmit optical antenna and a receive optical antenna, and a programmable optical network configured to provide a first light path from the at least one light emitter to a selected transmit optical antenna, the programmable optical network being further configured to provide a separate second light path from a receive optical antenna paired to the selected transmit optical antenna to the at least one light detector, wherein the plurality of paired optical antennas are positioned at or around a focal plane of the lens.

In some embodiments, the plurality of paired optical antennas and the programmable optical network are integrated on a photonic integrated circuit In one implementation, the at least one light emitter is a frequency-modulated continuous-wave laser, and the at least one light detector is a coherent optical receiver comprising balanced photodetectors or in-phase/quadrature double balanced photodetectors, wherein a fraction of the at least one light emitter is tapped off by a 1×2 coupler to produce a local oscillator of the coherent receiver.

In one example, the at least one light detector is integrated into a pixel, the pixel comprising a 1×2 optical switching unit, a 1×2 coupler to split a fraction an output of the at least one light emitter to produce a local oscillator, a transmit optical antenna, a paired receive optical antenna, and a coherent receiver configured to receive optical signals from at least one receive optical antenna and the local oscillator.

In some embodiments, the at least one light detector is shared by a plurality of pixels, each pixel comprising the selected transmit optical antenna, the receive optical antenna paired to the selected transmit optical antenna, a dual-channel 1×2 optical switch comprising two parallel switches connecting an optical bus waveguide to the selected transmit optical antenna and a second optical bus waveguide connected to the receive optical antenna paired to the selected transmit optical antenna, wherein the programmable optical network is programmed to provide a light path from at least one light emitter to the selected transmit optical antenna and a physically separate light path from the receive optical antenna paired to the selected transmit optical antenna to the at least one light detector.

In some examples, optical energy from the at least one light emitter is delivered to multiple selected pixels through an optical splitter or optical amplifier.

In one embodiment, a separate light emitter is used for each group of pixels.

In some examples, the at least one light emitter or the at least one light detector, or both, are integrated on the photonic integrated circuit.

In one embodiment, the at least one light emitter or the at least one light detector, or both, are integrated on a separate second photonic integrated circuit and coupled to the photonic integrated circuit.

In some embodiments, the at least one light emitter or the at least one light detector, or both, are connected to the photonic integrated circuit by optical fibers, polymer waveguides, other type of waveguides, or coupled through free-space with optical elements such as lenses or grating couplers.

In other embodiments, the transmit optical antenna and the receive optical antenna of the plurality of paired optical antennas are side by side in the same optical layer.

In one embodiment, the transmit optical antenna and the receive optical antenna of the plurality of paired optical antennas are integrated vertically on separate optical layers.

In some examples, the transmit optical antenna and the receive optical antenna of the plurality of paired optical antennas have orthogonal polarizations, and wherein the system further comprises a quarter-wave plate disposed before or after the optical lens.

In other embodiments, each receive optical antenna of the plurality of paired optical antennas comprise two antennas with orthogonal polarizations and are configured to detect reflected optical signals in both of the orthogonal polarizations.

In some implementations, the programmable optical network is controlled by one or more micro-electro-mechanical system (MEMS) actuators, or Mach-Zehnder interferometers with electro-optic or thermo-optic phase modulators, or microring resonators with electro-optic or thermo-optic phase modulators.

A method of performing LiDAR imaging is provided, comprising the steps of controlling a programmable optical network to provide a first light path from at least one light emitter to a selected transmit optical antenna of a paired optical antenna of the optical network, controlling the programmable optical network to provide a separate second light path from a receive optical antenna paired to the selected transmit optical antenna to at least one light detector.

In some examples, controlling the programmable optical network comprises actuating one or more MEMS switches.

In another example, actuating the one or more MEMS switches further comprises energizing one or more electrodes disposed within the one or more MEMS switches.

In some embodiments, the method further comprises delivering optical energy from the at least one light emitter to multiple selected pixels through an optical splitter.

In one embodiment, three-dimensional images are acquired by combining the range measurements of multiple pixels.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 9A-9C shows an embodiment of vertically stacked antennas.

DETAILED DESCRIPTION

The present disclosure is directed to imaging LiDARs with separate transmit (Tx) and receive (Rx) optical antennas fed by different optical waveguides. In some embodiments, the optical antennas can be grating couplers, photonic crystals, resonant couplers, 45-degree (or other angle) mirrors, prism couplers, or tilted waveguides. This pair of optical antennas can be activated at the same time through a dual-channel optical switch network, with the Tx antenna connected to a laser source and the Rx antenna connected to a receiver. The Tx and Rx antennas can be positioned adjacent to each other, so they point to approximately the same far-field angle. No optical alignment between the Tx and Rx is necessary. This LiDAR configuration, referred to herein as pseudo-monostatic LiDAR, eliminates spurious reflections and increases the dynamic range of the LiDAR.

Figure 1:
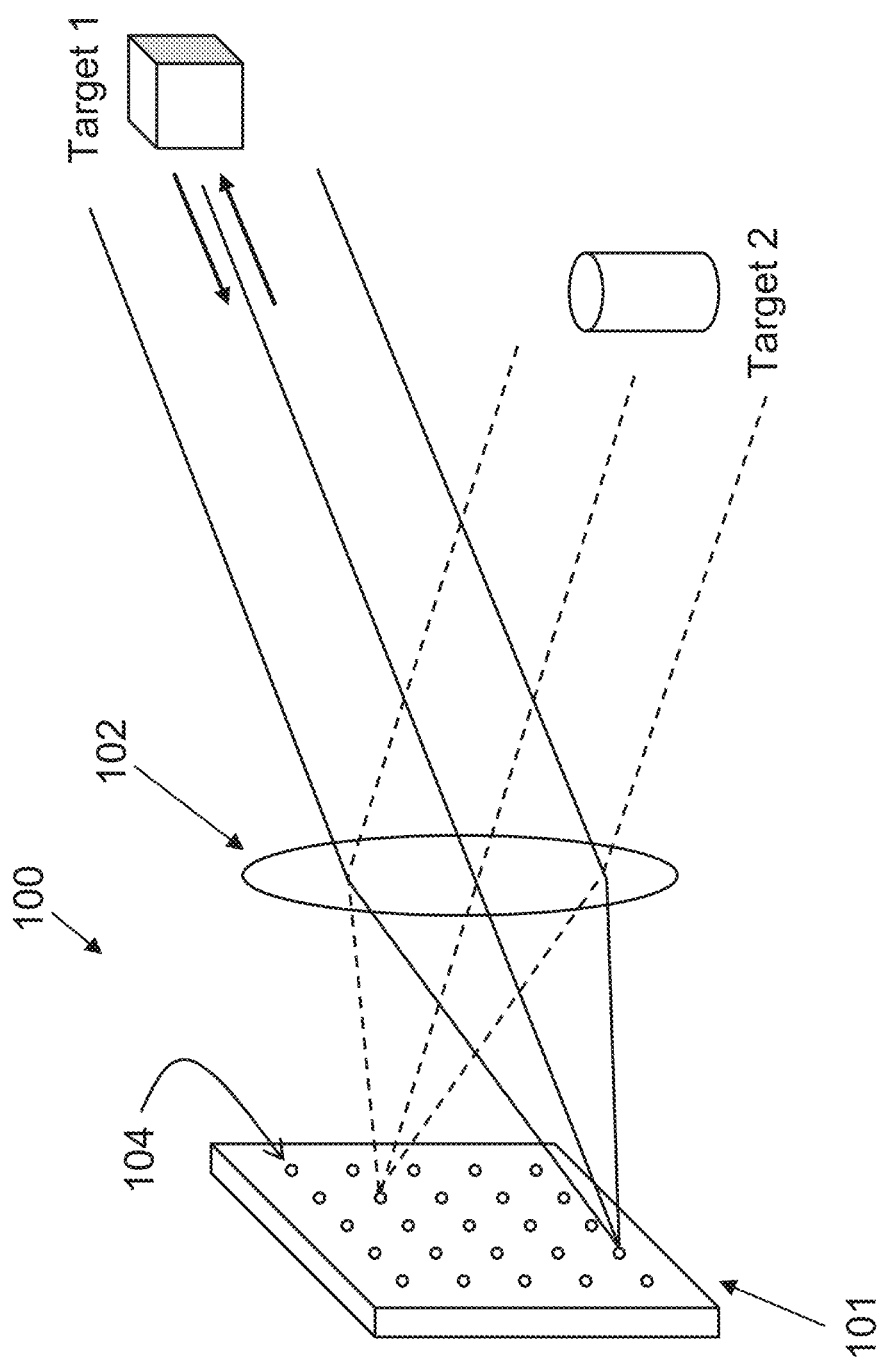
FIG. 1 is one example of imaging based LiDAR with a monostatic array.

One example schematic of a monostatic imaging LiDAR 100 is shown in FIG. 1. A photonic integrated circuit (PIC) 101 with a two-dimensional (2D) array of optical antennas is placed at the focal plane of an imaging lens 102. An optical switch network in the PIC selectively activates one or more optical antennas 104 at a time. Each activated optical antenna transmits light to a certain direction (Tx) and the same antenna receives reflected light from target (Rx). This creates a one-to-one mapping between the lateral position of the optical antenna and the far-field angle, as illustrated by the optical beam paths from two separate optical antennas pointing to Target 1 and Target 2. This is referred to herein as monostatic LiDAR, in which the transmitter and the receiver share the same optical antenna. The Tx and the Rx far-field angles are automatically aligned, but the LiDAR receiver is susceptible to residue reflections in the shared optical path and antenna. Residue reflections can comprise unwanted reflections caused by some elements in the optical path from the light source (laser) to the target. These residue reflections can also be delivered to the receiver and they can potentially hinder the detection of the real target signal (especially for weak target signals at longer distances).

Figure 2:
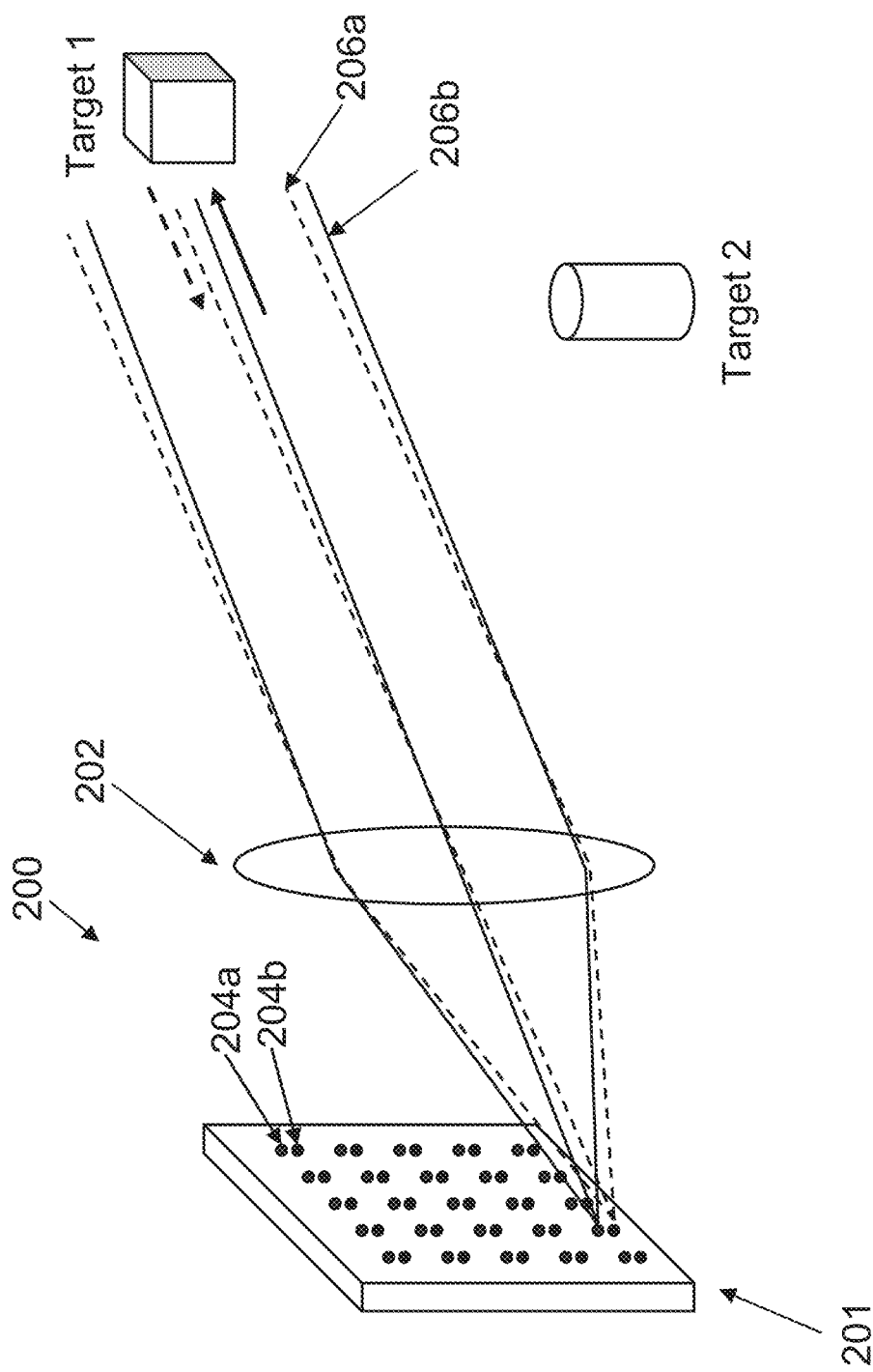
FIG. 2 is one example of a proposed pseudo-monostatic imaging LiDAR.

The schematic of a pseudo-monostatic imaging LiDAR 200 is shown in FIG. 2. In this embodiment, the transmitter and the receiver use separate optical antennas and separate optical waveguides to feed the transmit and receive antennas. Thus, while the embodiment of FIG. 1 included an array of optical antennas in which the antenna at each pixel location comprises a combination transmit/receive antenna, the embodiment of FIG. 2 includes a PIC 201 with an array of optical antennas with separate transmit antennas 204a and receive antennas 204b for each pixel at the focal plane of an imaging lens 202. To minimize the crosstalk between the Tx and Rx signals (e.g., leakage of signals from one channel to another), the optical antennas can be displaced on the PIC 200 either laterally (X or Y direction) or perpendicular to the focal plane (Z direction), or a combination of both. Since the far-field angle is mapped to the lateral position of the antenna, the Tx and Rx far-field angle differs slightly when the antennas are displaced in the X or Y direction, as indicated by the optical beam paths 206a and 206b in FIG. 2. The difference in far-field angle is approximately $\delta r/f$, where $\delta r$ is the distance between the optical antennas in the X-Y plane and f is the focal length of the lens. Since $\delta r$ is very small, the instantaneous field-of-view of the Tx and the Rx antennas have substantial overlap on targets. In another embodiment, the Tx and Rx optical antennas can be stacked vertically instead of being displaced laterally. In this case, the Tx and Rx optical antennas will point exactly in the same direction but with slightly different divergence angles. A light beam spreads and diverges more as the light propagates farther. In this example where the Tx antenna is stacked vertically with the Rx antenna, the target distance from the Tx antenna is slightly different from the target distance from the Rx antenna by the vertical displacement between the Tx and Rx antennas. The difference is very small since the separation is on the order of a micrometer.

Figure 3:
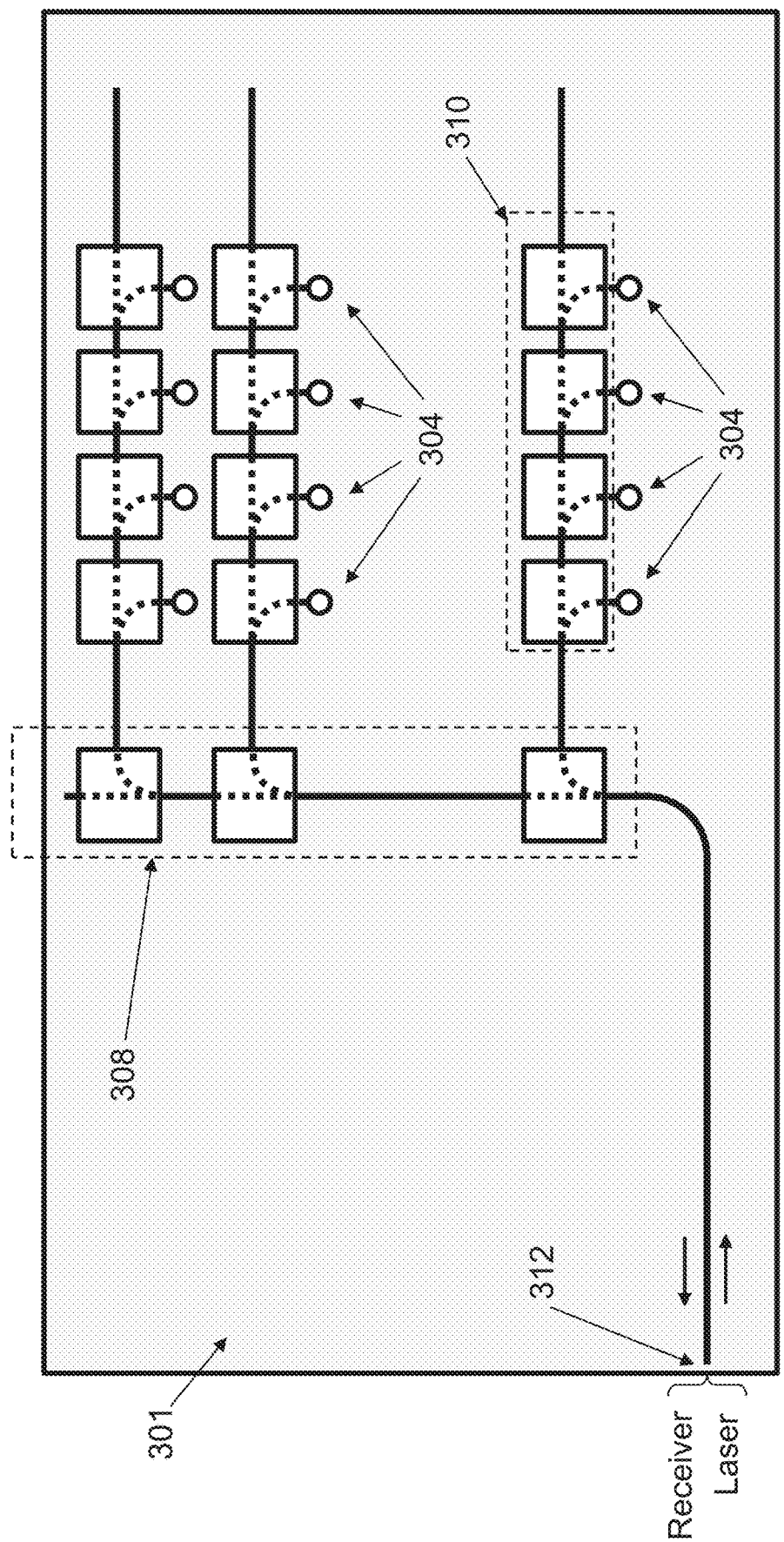
FIG. 3 illustrates a 1×M switch (row selection switch) to select the active row and a 1×N switch (column selection switch) to select the optical antenna.

A programmable optical switch network can connect the selected Tx antenna to the laser and the Rx antenna in the same pair to the receiver. Suitable programmable optical switch networks for connecting the monostatic antenna arrays have been described by US Pub. No. US2021/0116778 which is incorporated herein by reference. FIG. 3 illustrates a programmable optical network on a PIC 301 that uses a 1×M switch (row selection switch 308) to select the active row and a 1×N switch (column selection switch 310) to select the optical antenna 304 (FIG. 3 shows a M×N array of optical antennas 304). The programmable optical network can be coupled to a receiver and a laser, as shown. The laser light is modulated, either directly or through a modulator, to generate interrogating light. In pulsed time of flight system, the laser is modulated to produce short (~nanosecond) optical pulses, and the receivers are made of avalanche photodiodes (APD) or single photon avalanche diodes (SPAD). In frequency-modulated continuous-wave (FMCW) system, the laser frequency increases or decrease linearly with time. Coherent receivers mix the received light signals with part of the laser light (called local oscillator or LO) in p-i-n photodiodes or APDs to extract the beat frequencies. The p-i-n photodiodes or APDs are often arranged in balanced configuration to extract the difference signals. This system is referred to as FMCW LiDAR or coherent LiDAR. In this example, the 1×M switch comprises M 1×2 switches and the 1×N switch comprises N 1×2 switches. Other possible arrangements are discussed in US Pub. No. US2021/0116778. As mentioned earlier, the Tx and Rx in this embodiment share not only the optical antenna but also the common optical path including waveguides, optical switches, and the input/output coupler 312. The residue reflection from any of these components add a fraction of the Tx signal to the Rx signal. Since the Tx signal is much stronger, the reflection produces spurious signals and saturate the amplifiers in the receiver.

Figure 4A:
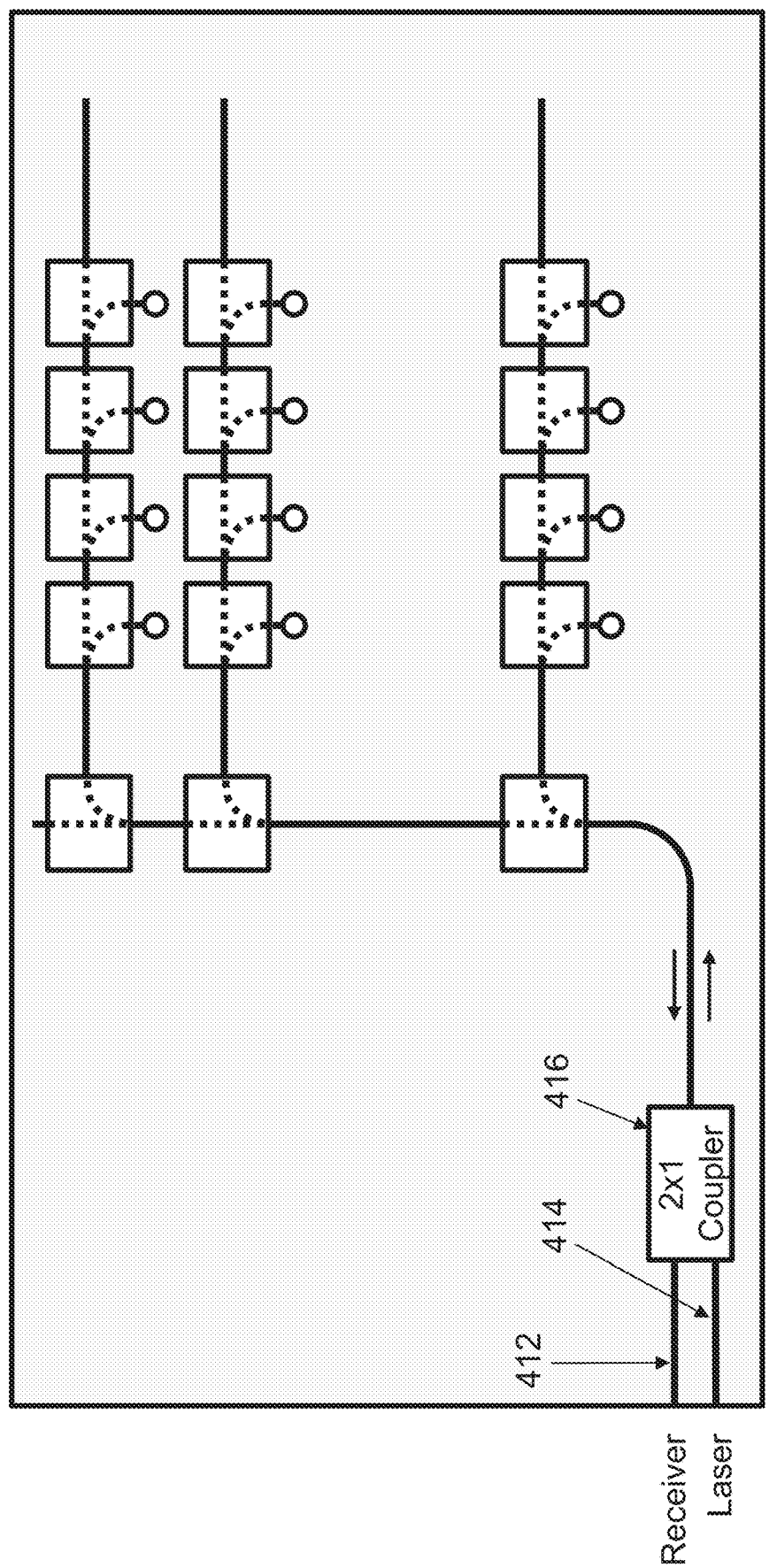
FIG. 4A illustrates a monostatic array with separate input and output ports connected by a 1×2 coupler.

Sometimes the strongest reflections occur at the shared input/output coupler. In one embodiment, this reflection can be removed by using a separate input port 412 and output port 414 connected by a 2×1 coupler 416, as shown in the embodiment of FIG. 4A. In this implementation, however, half of the laser power and half of the received signal are lost in the 2×1 coupler.

Figure 4B:
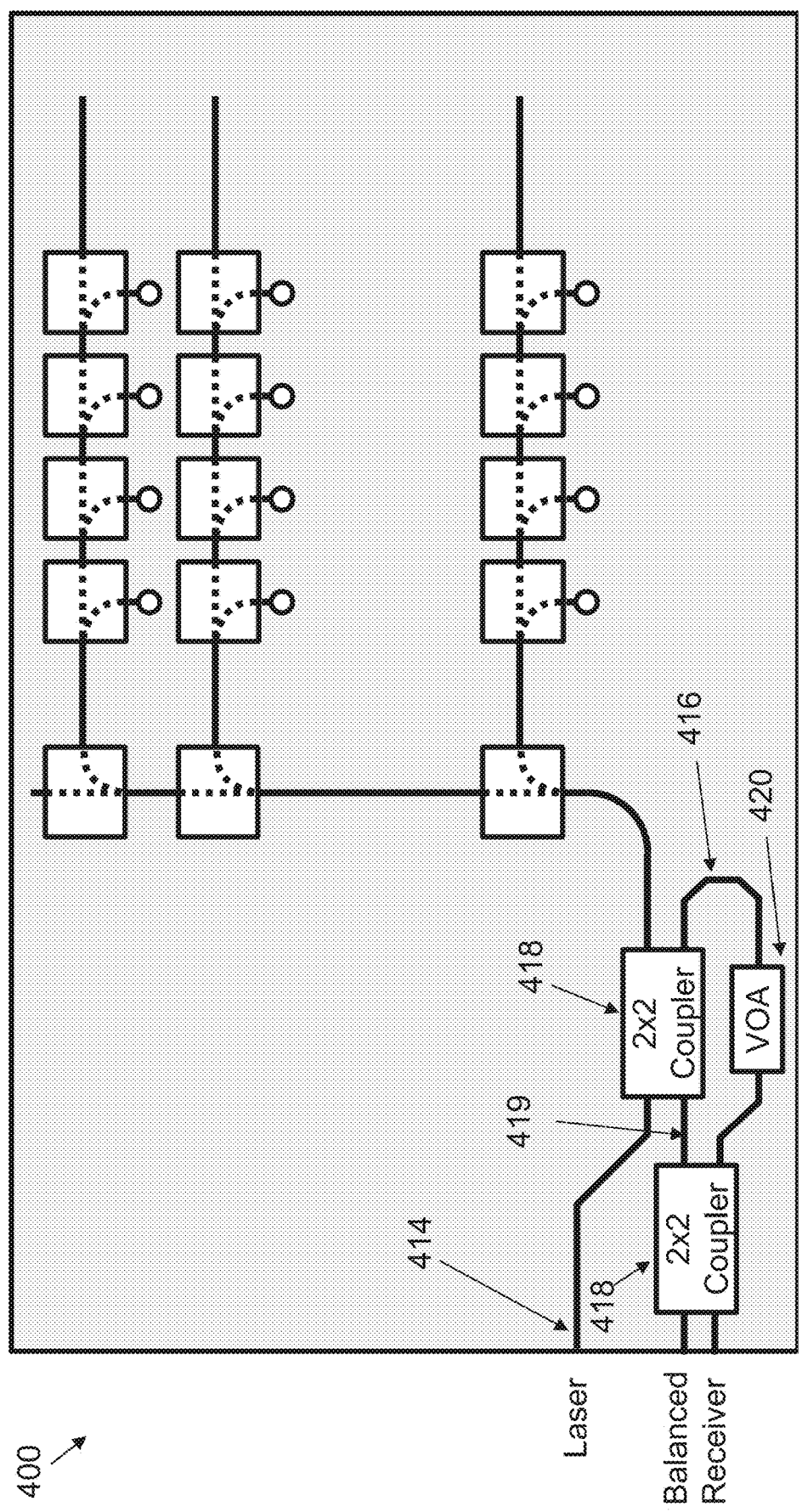
FIG. 4B shows an alternative embodiment of coherent LiDARs such as frequency-modulated continuous-wave (FMCW) LiDARs.

FIG. 4B shows an alternative embodiment of coherent LiDARs 400 such as frequency-modulated continuous-wave (FMCW) LiDARs. This embodiment includes a pair of 2×2 couplers 418 optically coupled to the laser, a variable optical attenuator (VOA) 420, and a balanced receiver. Part of the laser power 416 is attenuated by VOA 420 and routed to the balanced receiver as local oscillator (LO). The LO is combined with the receiver signal (419) through the 2×2 coupler (418) and sent to balanced receiver. In either case, the LiDAR is still susceptible to residue reflections from other components.

Figure 5A:
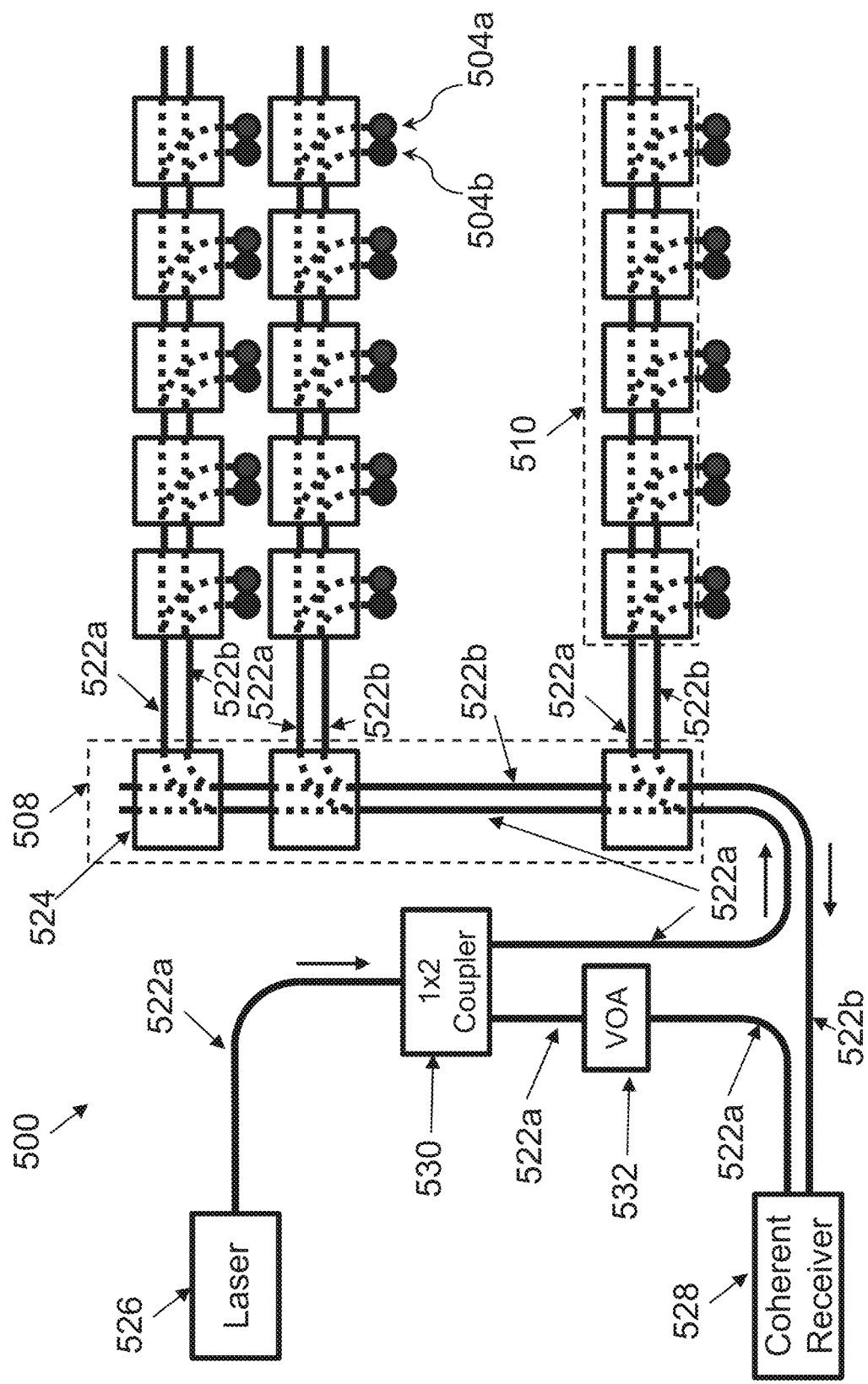
FIG. 5A shows an embodiment of a coherent pseudo-monostatic LiDAR.

FIG. 5A shows an embodiment of a coherent pseudo-monostatic LiDAR 500. Two separate waveguides, such as transmit waveguide(s) 522a and receive waveguide(s) 522b, are used to connect the transmit (Tx) optical antennas 504a and receive (Rx) optical antennas 504b. To distribute the optical signals, the optical switch network uses dual channel 1×2 switches 524 to simultaneously select the Tx optical antennas and Rx optical antennas in the same pixel. The dual channel 1×2 switches are essentially two separate MEMS optical switches. They might share the same MEMS actuators as they are always actuated in pairs. The optical paths are physically separated to suppress optical reflections or crosstalk. The laser 526 and the receiver or coherent receiver 528 are connected to the Tx optical antennas and Rx optical antennas, respectively, by first activating a dual channel row-selection switch 508 and then activating a dual channel column-selection switch 510. Here, a small portion of the laser power is tapped off as the local oscillator (LO) by a 1×2 coupler 530 and sent to the coherent receiver 528 through the variable optical attenuator (VOA) 532 (which reduces the light power of the LO). The other split light from the laser and the 1×2 coupler is the target signal, which is sent to a target via the transmit optical antenna(s) and the reflected light from the target is received by the receive optical antenna(s) and sent to the coherent receiver 528 to be mixed (interfered) with the LO light. The coupling ratio of this coupler 530 is chosen to provide optimum power to the coherent receiver (e.g., 1% of the laser power from 526). As shown, the variable optical attenuator (VOA) can be added to finely control the LO power.

Figure 5B:
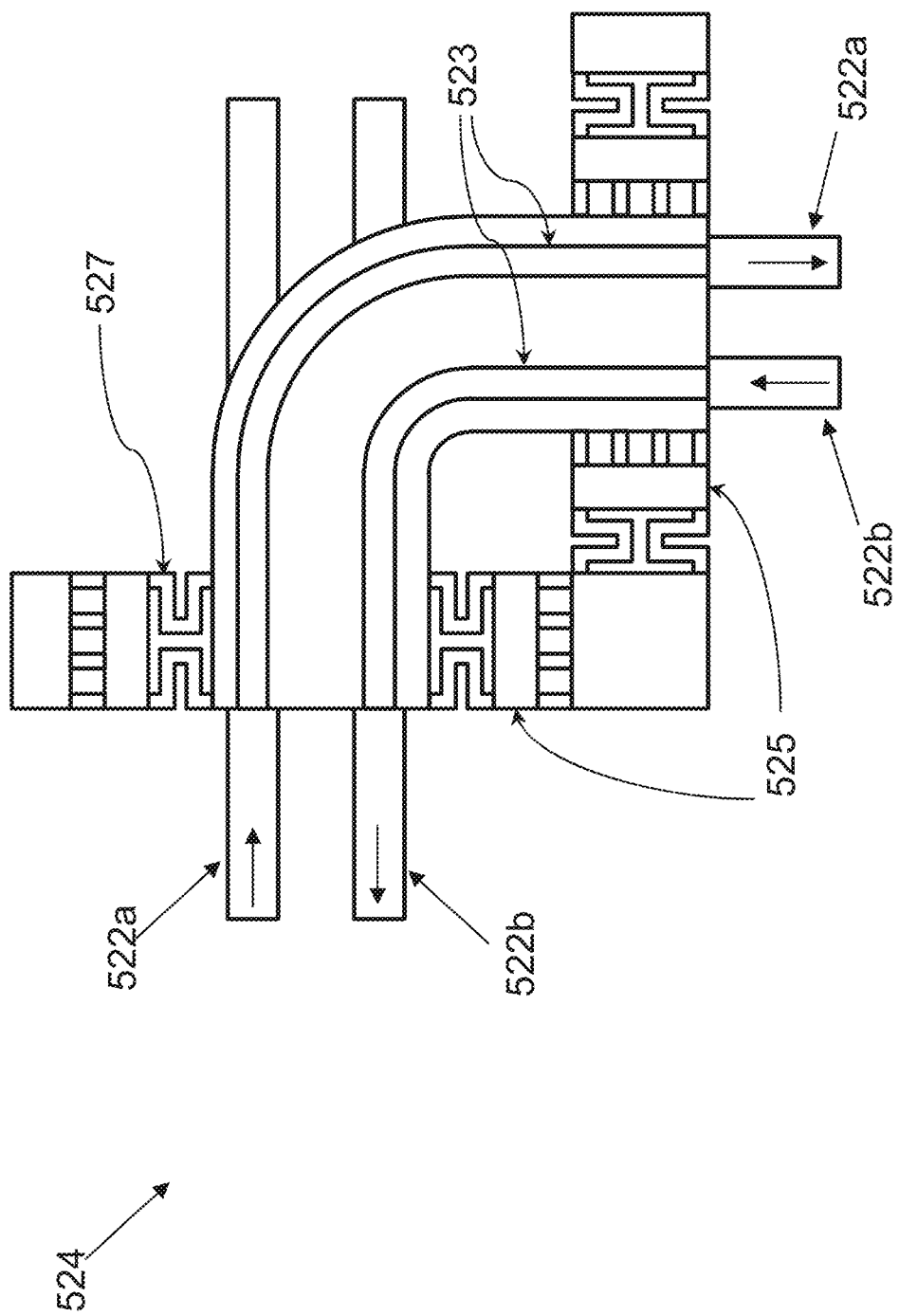
FIG. 5B is a close-up view of one example of the dual channel 1×2 switch described in FIG. 5A

FIG. 5B is a close-up view of one example of the dual channel 1×2 switch 524 described in FIG. 5A. In this embodiment, the switch 524 is implemented as a MEMS switch. As shown, the switch 524 can include a plurality of coupler waveguides 523 optically coupled to the transmit waveguide(s) 522a and receive waveguide(s) 522b (corresponding to the same elements described in FIG. 5A). The switch 524 can further include a plurality of MEMS electrodes 525 and MEMS springs 527 connected to the plurality of coupler waveguides 523. By applying a voltage between the MEMS electrodes and the matching fixed electrodes on the substrate, the coupler waveguides will be pulled down to the close proximity of the transmit and receive waveguides through evanescent coupling. Though this embodiment uses electrostatic actuators, other MEMS actuators can be used, including, but not limited to, thermal, electrothermal, magnetic, electromagnetic, piezoelectrical actuators. Operation of the MEMS electrodes and MEMS springs brings the coupler waveguides into and out of communication with the transmit and receive waveguides, respectively. Therefore, the switch 524 can be selectively controlled to transmit light energy from the transmit/receive waveguides when desired. Since the dual channel switch shares many common structures such as the MEMS actuators and mechanical springs, it is more compact than two separate switches. The smaller footprint is advantageous for high density arrays and high-resolution imaging LiDARs. Though only two channels are shown in this embodiment, the design can be extended to higher channel count.

Figure 5C:
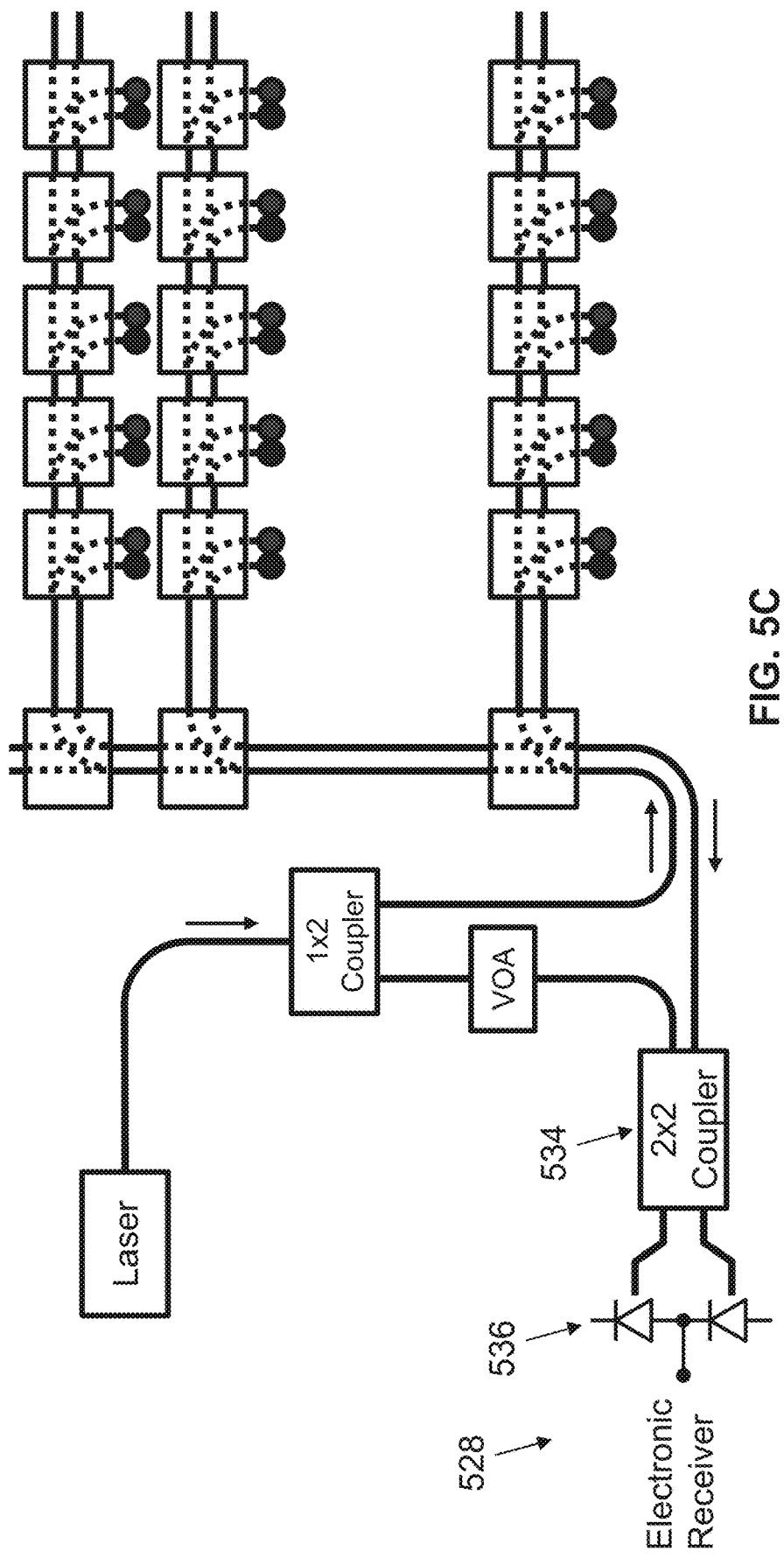
FIG. 5C is a detailed view of a coherent detector.

One embodiment of a coherent detector or receiver 528 is shown in detail in FIG. 5C. The received optical signal is mixed with the local oscillator (LO) in a 2×2 coupler 534 and detected by a pair of balanced photodiodes 536. The difference in photocurrent is amplified and processed to extract the distance and velocity of the target. In one example, the current is amplified by the electronic receiver circuitry (e.g., a trans-impedance amplifier, TIA) and the information is digitized and processed by digital signal processors such as ASIC, FPGA, etc.

Figure 5D:
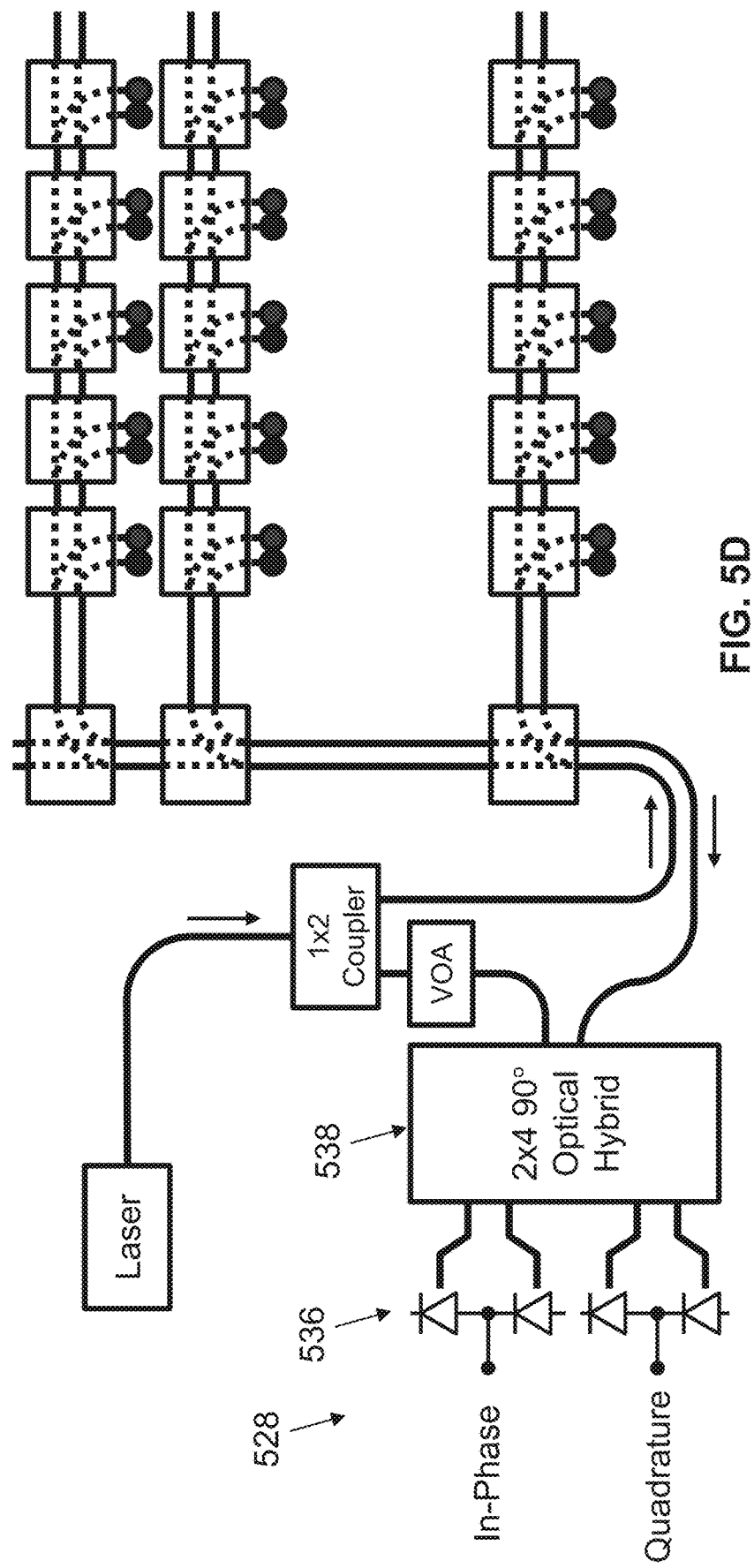
FIG. 5D is a coherent detector comprising a balanced I/Q detector to detect both the in-phase (I) and the quadrature (Q) components of the signal.

In another embodiment shown in FIG. 5D, the coherent receiver 528 comprises a balanced I/Q detector to detect both the in-phase (I) and the quadrature (Q) components of the signal. Here, a 2×4 90° optical hybrid 538 is used to produce 4 different combinations of the received optical signal and LO. A pair of balanced photodetectors 536 are used to extract each of the I and Q components of the beat signal.

Though coherent LiDAR is used in this example, the same architecture can also be used for pulsed LiDAR. In that case, the LO part is not required, and the coherent receiver can be replaced by a photodiode or avalanche photodiode (APD) followed by amplifiers.

Figure 6A:
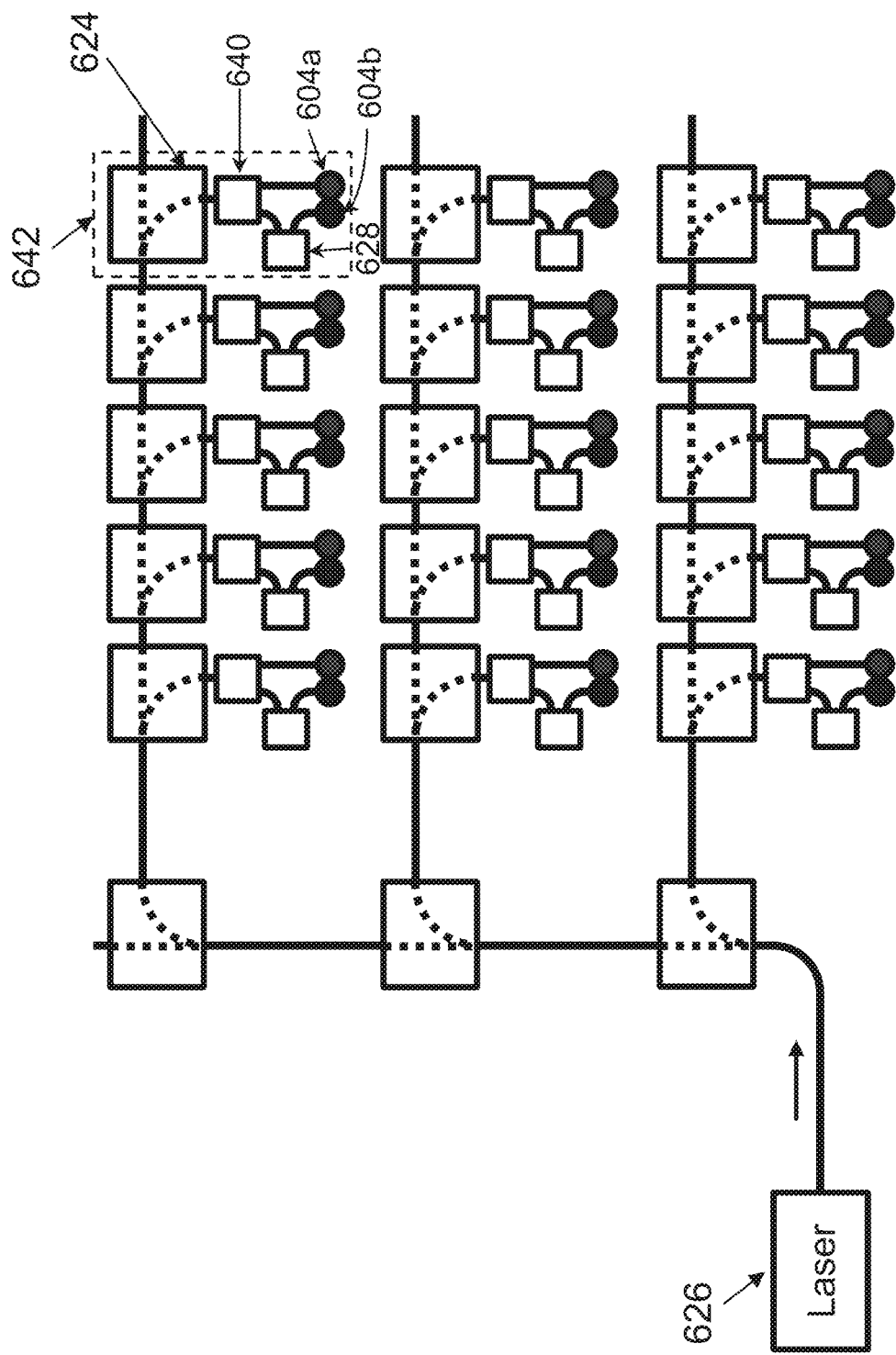
FIG. 6A shows one embodiment of a coherent detector integrated into each pixel.

Multiple lasers and detectors can be used to speed up the operation of the imaging LiDAR. In FIG. 6A, a coherent receiver 628 is integrated into each pixel 642 of the array. For purposes of the description, we refer to a pixel here as including a transmit antenna 604a, a receive antenna 604b, a coherent receiver 628, a 1×2 coupler 640, and a switch 624 (single channel). As shown, the architecture can include an array of pixels. The laser power is delivered to the selected pixel by an optical switching network as described above. In addition to the coherent detector, the pixel comprises a Tx optical antenna 604a, an Rx optical antenna 604b, and a 1×2 coupler 640. The 1×2 coupler at each pixel location taps a small portion of the optical power from the laser 626 as a local oscillator (LO) for each respective coherent receiver. In this architecture, since the programmable optical network is only delivering the laser power to the selected pixel, only single channel switches 624 are needed. The received optical signal is converted to electrical signal at the pixel level. The electrical signal can be collected in a variety of ways. In the simplest case, all signals can be added together before sending to a common signal processor. Alternatively, the detected signals can be summed over a sub-group of pixels, e.g., a single row or a single column, or part of a row or part of a column, or a block of pixels spanning part of the rows and columns.

In another embodiment, a row/column addressing circuit can be used to read the detected signal from the active pixel. The detector addressing circuit can be synchronized with the programmable optical network to select the same pixel. In all cases, it might be advantageous to integrate a pre-amplifier in the pixel or for a sub-group of pixels to improve the signal-to-noise ratios and increase the operation speed.

Figure 6B:
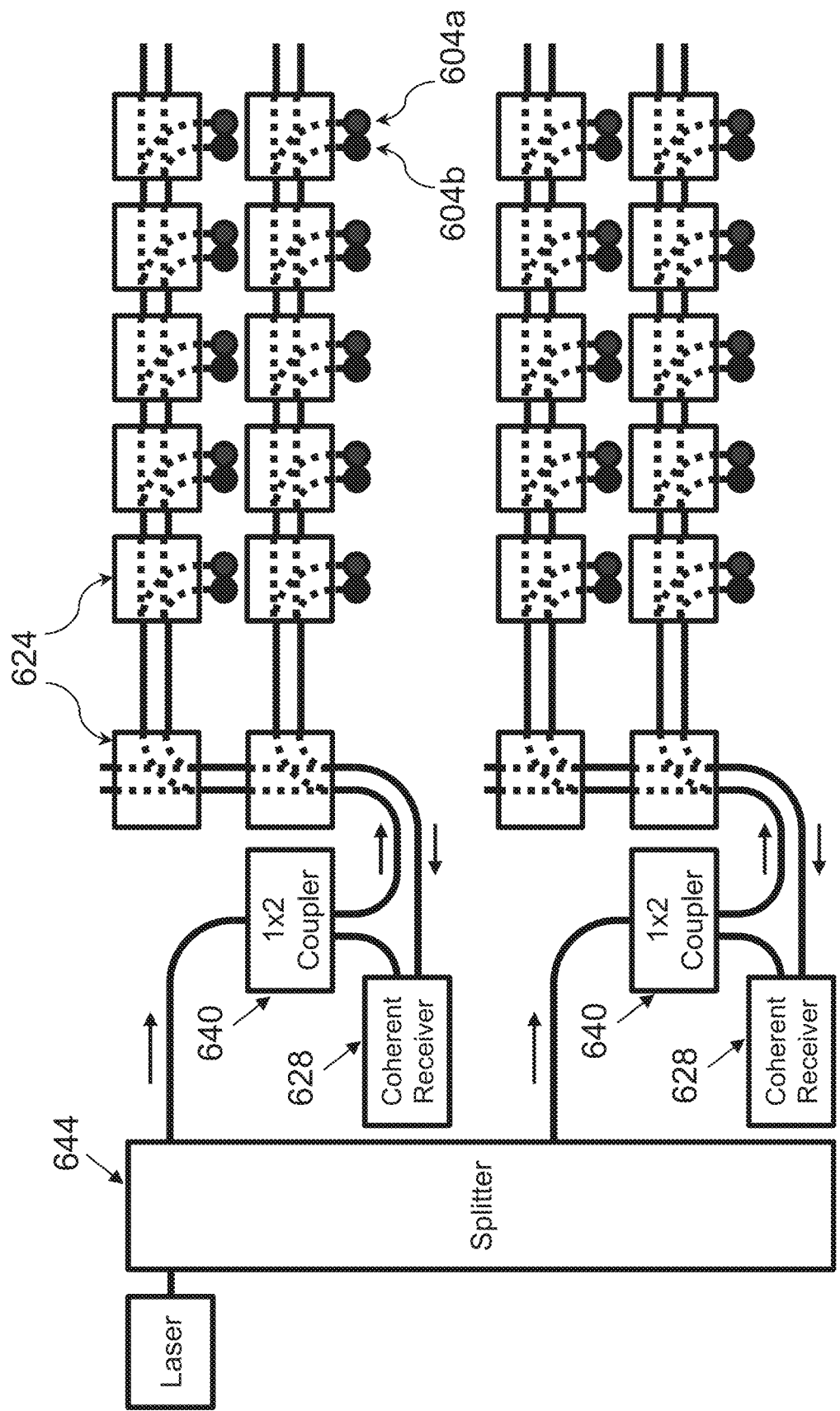
FIG. 6B shows an alternative embodiment where, instead of having a coherent detector at each pixel, the coherent detector can be shared by a block of pixels.

Alternatively, instead of having a coherent receiver at each pixel, the coherent receiver 628 and 1×2 coupler 640 can be shared by a block of pixels, as illustrated in FIG. 6B. A network of switches 624 (dual channel) can couple the waveguides to the transmit antennas 604a and receive antennas 604b. In this embodiment, a splitter 644 can be used to split the laser or light signal into multiple signals that can be fed into multiple arrays, as shown. This simplify the complexity of the pixel, which allows higher density of pixels to be integrated on the same area. This will increase the resolution of the LiDAR without increasing the size of the sensing area. Larger sensing area normally requires a larger optical lens. In this example, the laser power is distributed to each block by an integrated optical splitter.

Figure 6C:
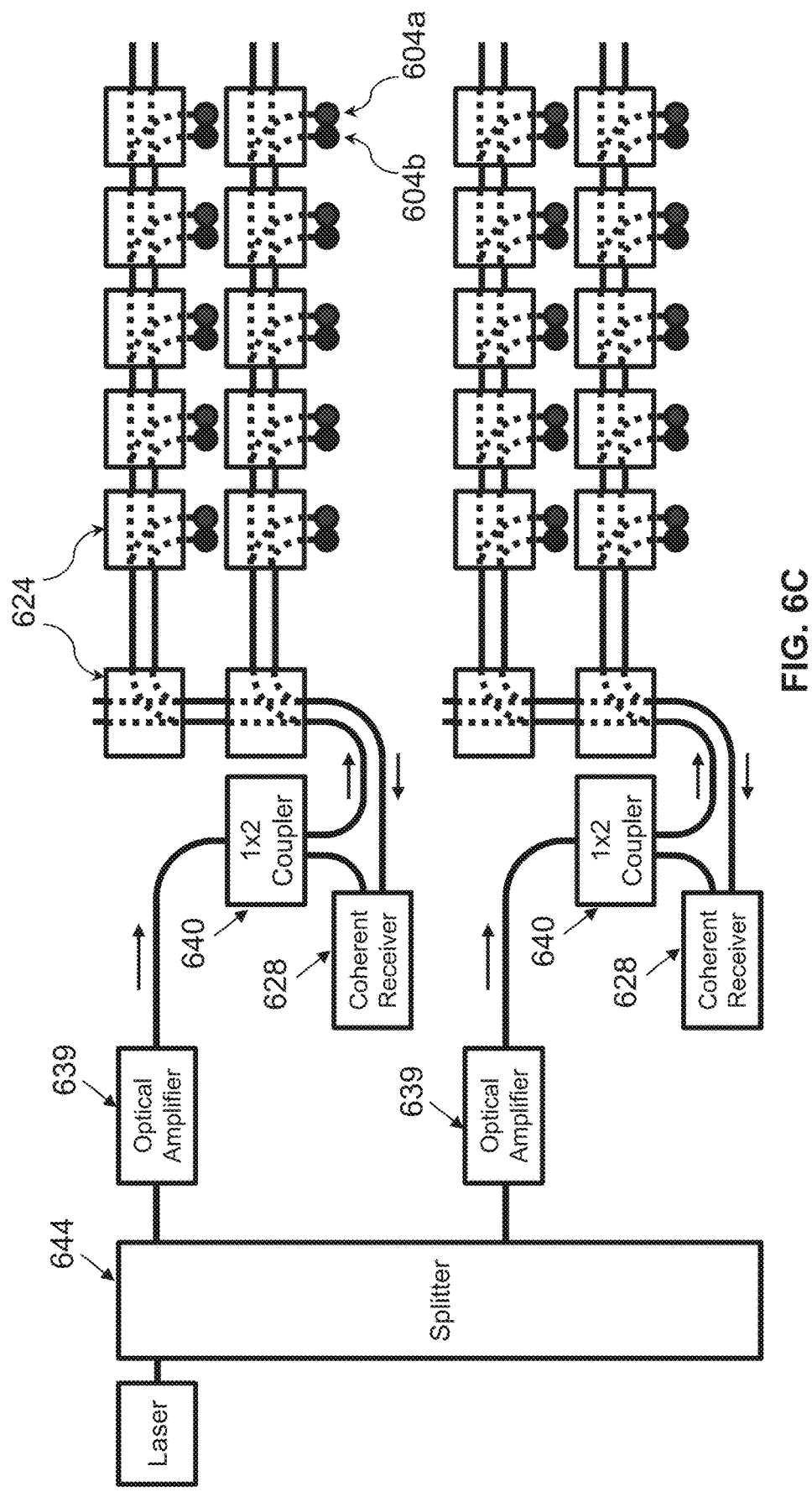
FIG. 6C shows an alternative embodiment where optical amplifiers are used to boost optical power after the optical splitter.
Figure 6D:
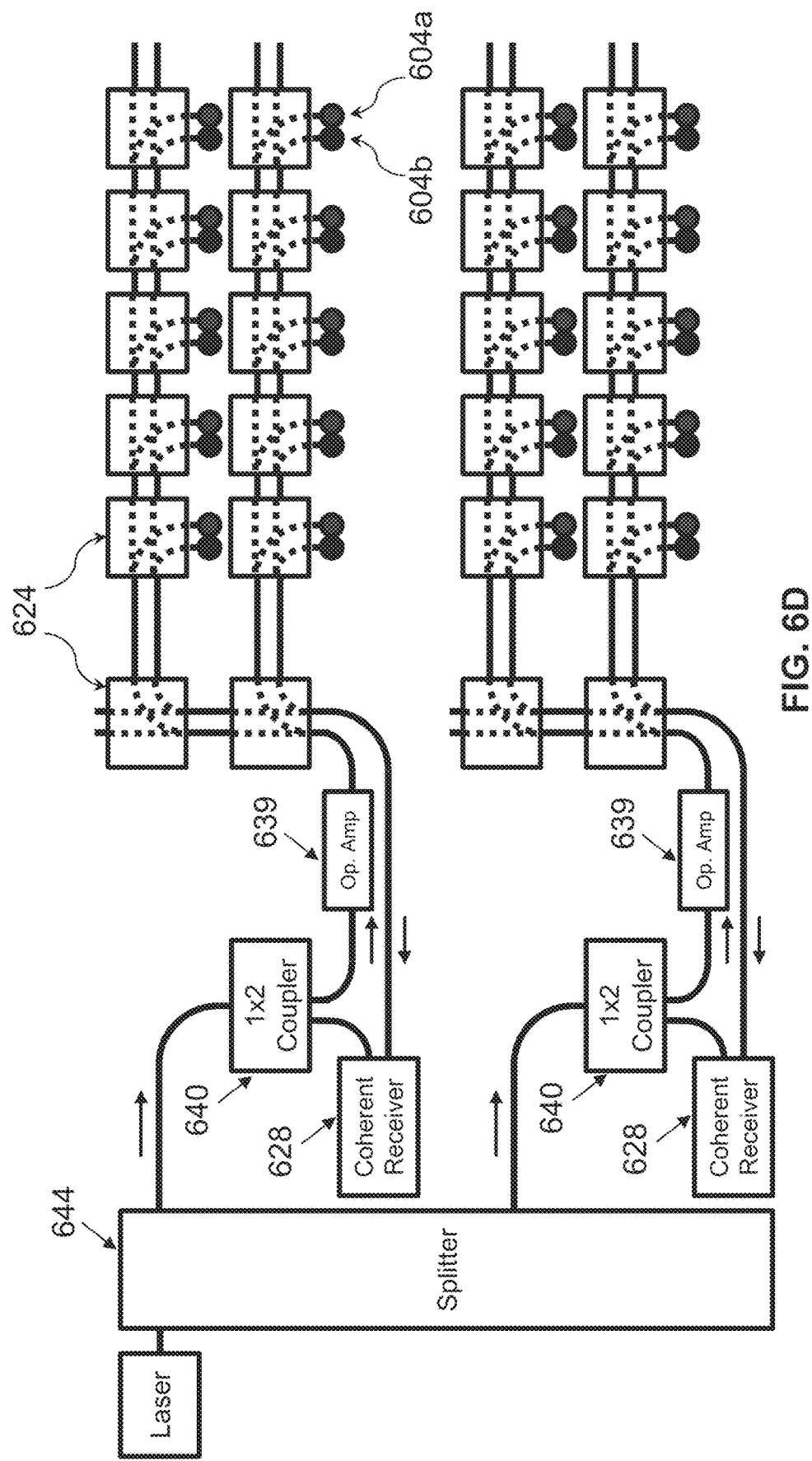
FIG. 6D shows an alternative embodiment where the optical amplifiers are placed in alternative locations.

Optical amplifiers 639 can be inserted between the optical splitter and the pixels as shown in the embodiment of FIG. 6C and FIG. 6D. The optical amplifiers can be placed either after the optical splitter (FIG. 6C) or after the 1×2 couplers (FIG. 6D).

Figure 6E:
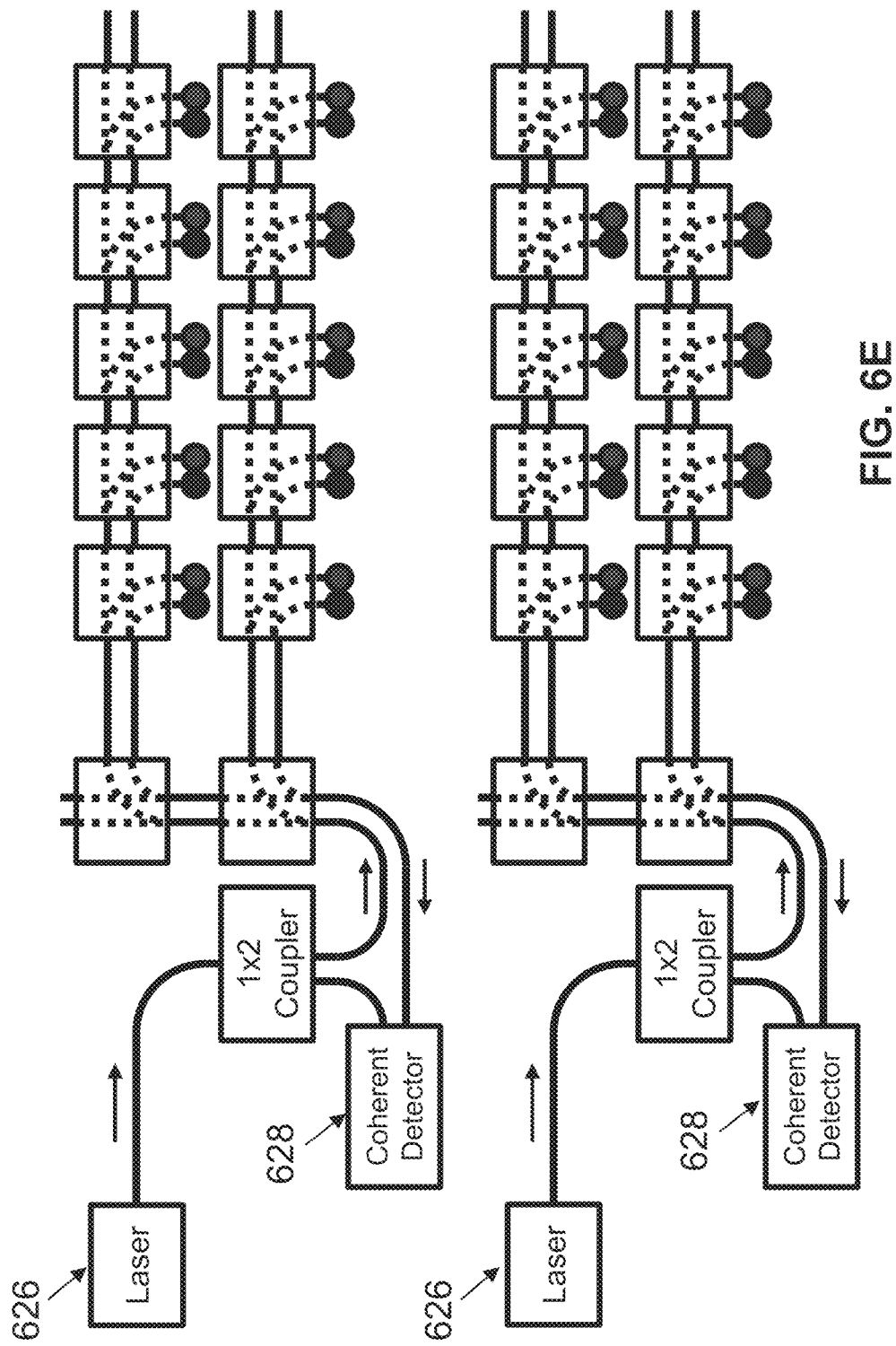
FIG. 6E shows an embodiment in which one laser and one detector are used for each block of pixels.

Alternatively, instead of using a splitter as shown in the embodiment of FIG. 6B, multiple lasers 626 can be employed to increase the optical power emitted from each pixel. In the embodiment shown in FIG. 6E, one laser and one coherent receiver 628 are used for each block of pixels. In general, any number of lasers and any number of detectors can be used with the programmable optical antenna array.

Figure 7A:
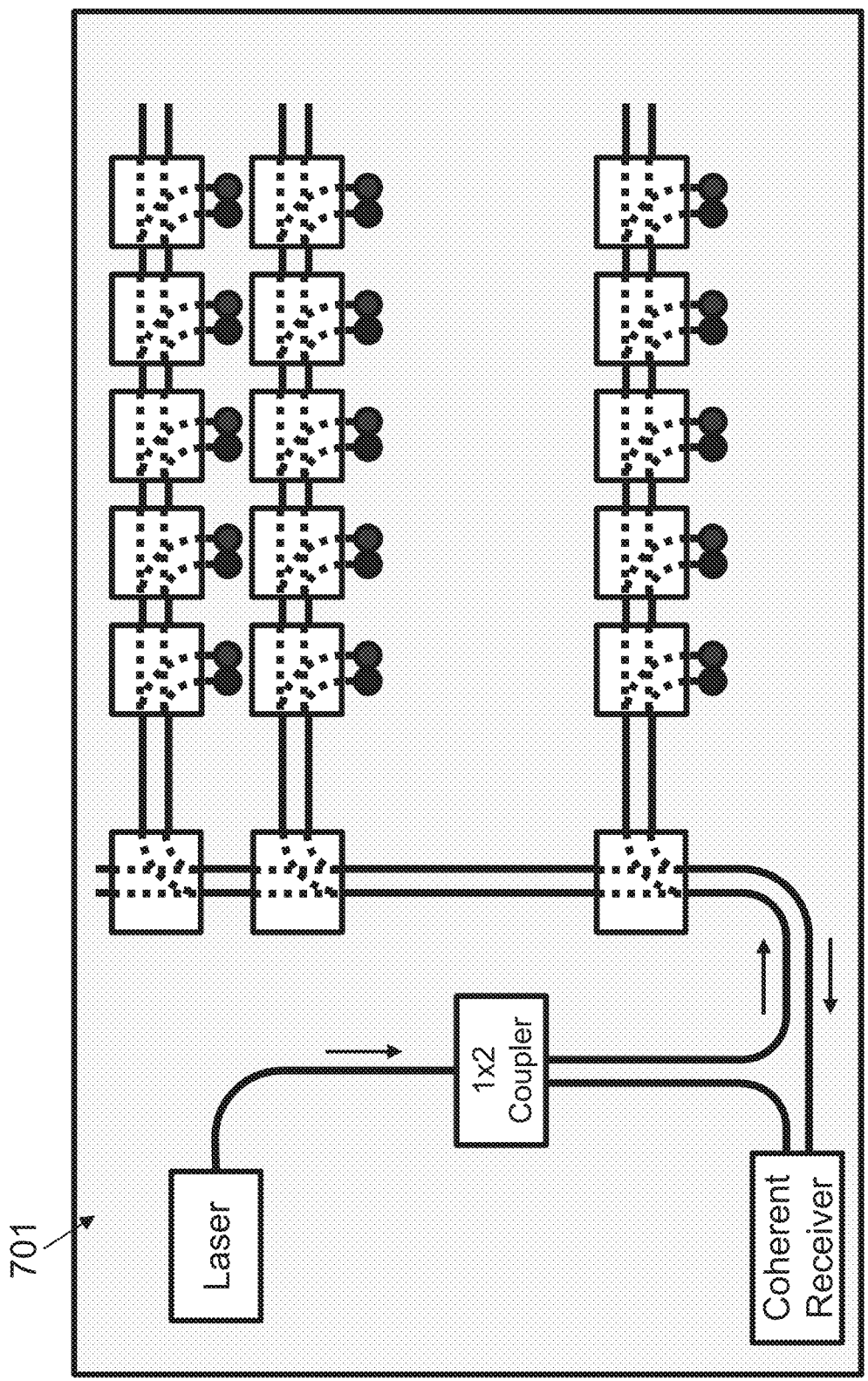
FIG. 7A shows an embodiment in which the lasers and the detectors are integrated on the same PIC
Figure 7B:
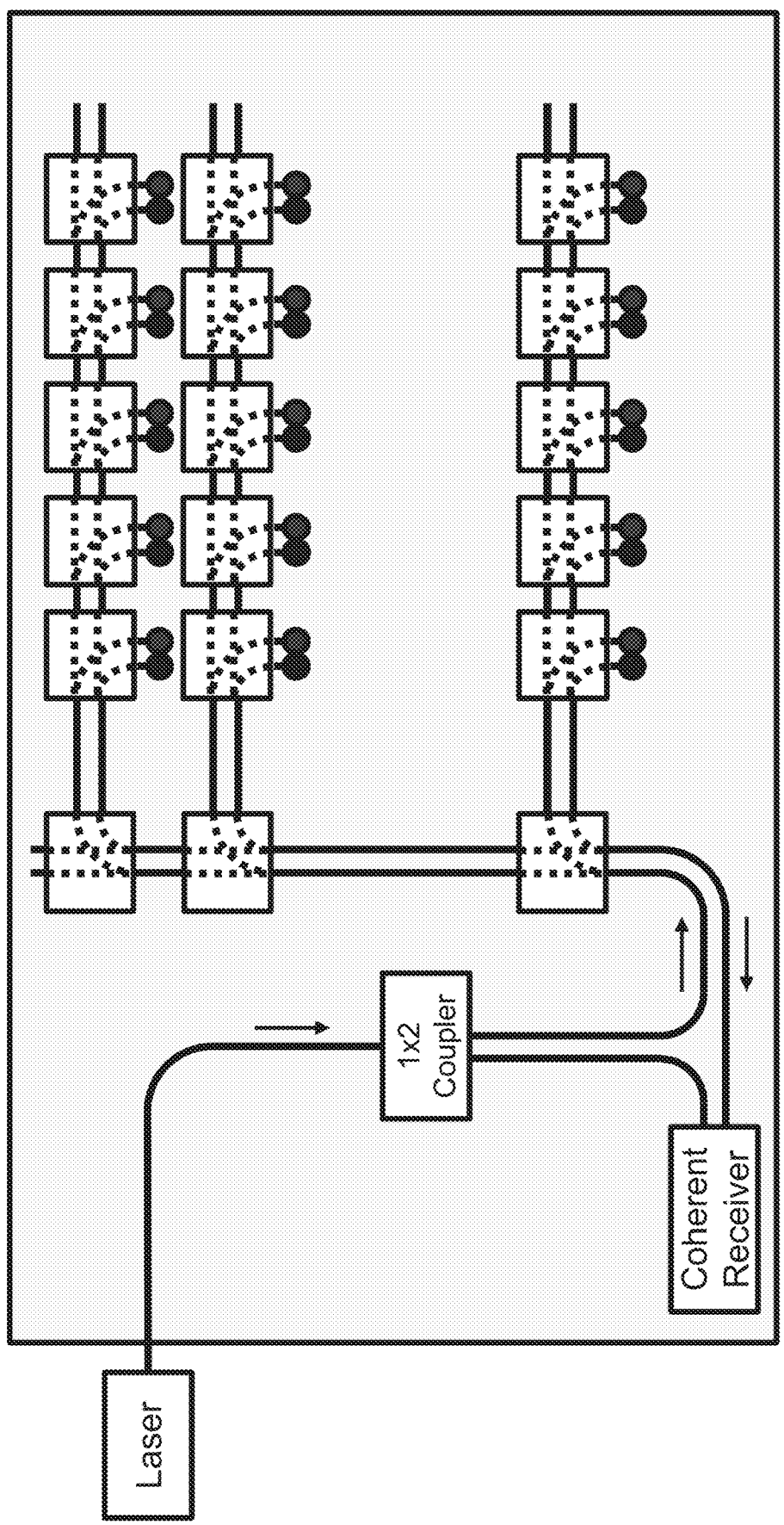
FIGS. 7B-7C show embodiments in which the lasers and detectors are located off chip and connected by fibers or other waveguides.
Figure 7C:
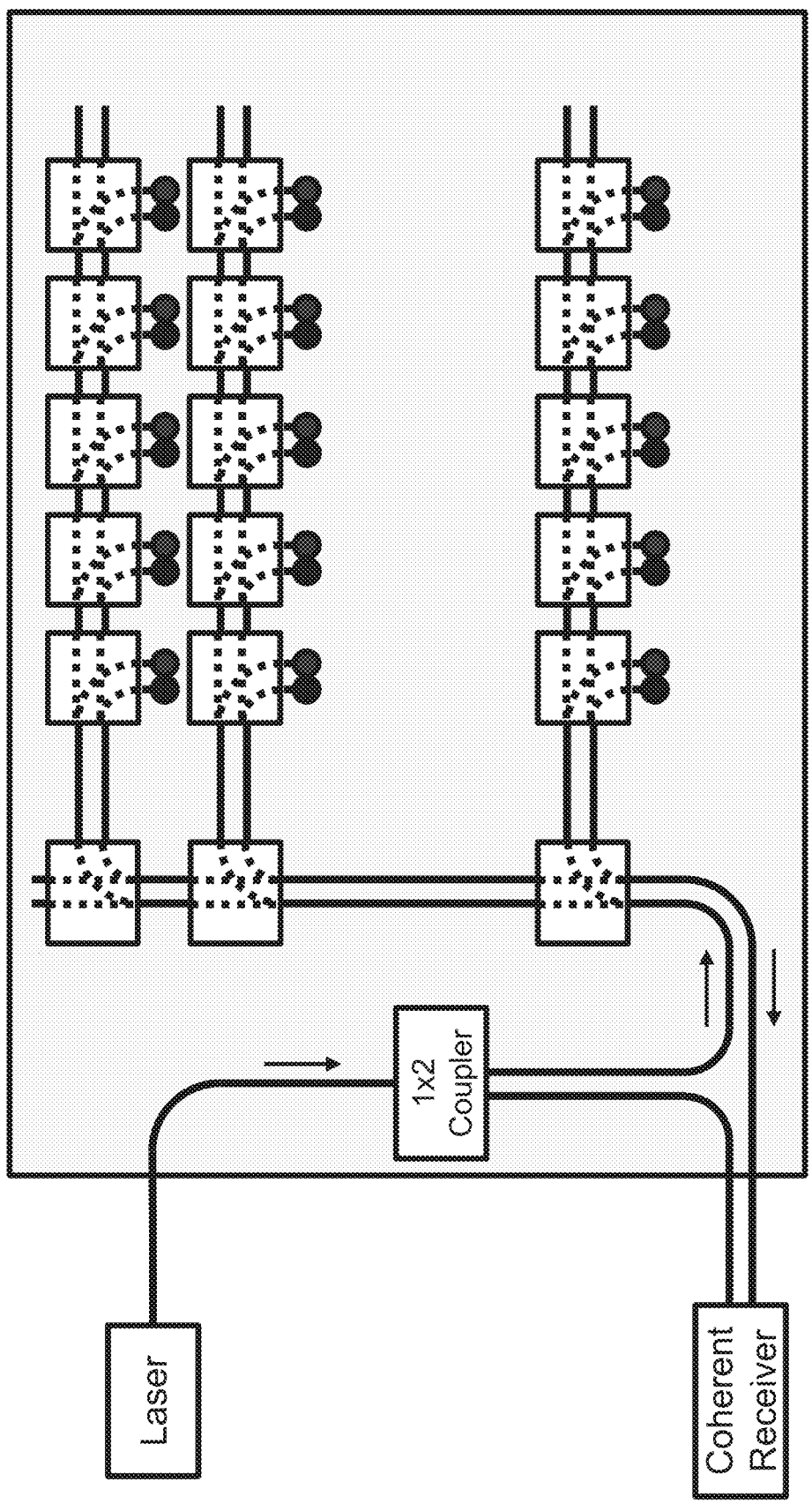
Figure 7D:
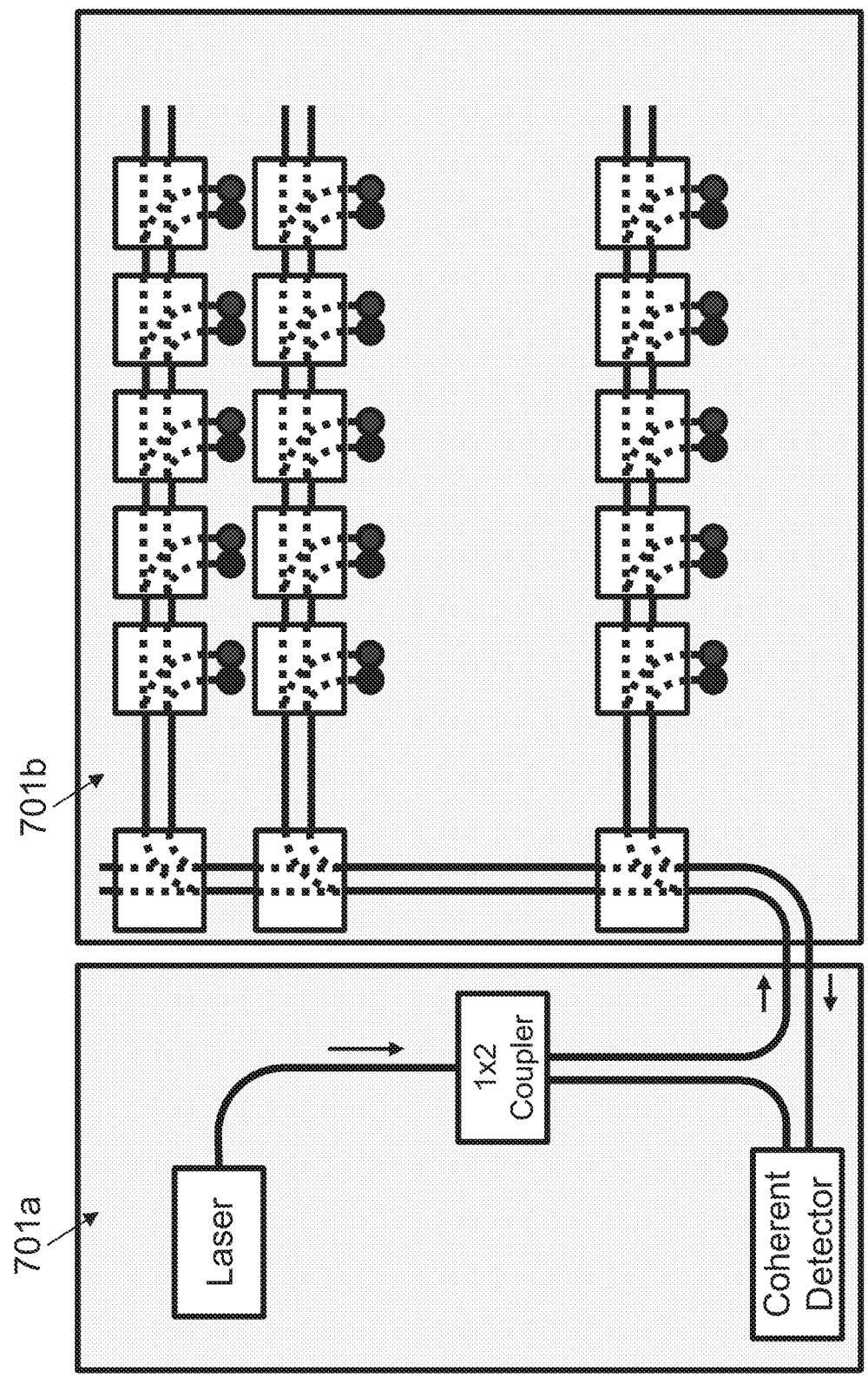
FIG. 7D shows an embodiment in which the lasers and the detectors are integrated on a separate PIC such as III-V PIC, and the two PICs are directly coupled to each other.

The optical antennas and the programmable optical network can be integrated on a single photonic integrated circuit, for example, using silicon photonics technology or other PIC platforms based on silicon nitride, silica, or III-V materials. The lasers and the detectors can be either integrated on the same PIC 701 (FIG. 7A) or located off chip and connected by fibers or other waveguides (FIGS. 7B and 7C). In another embodiment, the lasers and the detectors are integrated on a first PIC 701a such as III-V PIC, the array and other components are integrated on a second PIC 701b, and the two PICs are directly coupled to each other (FIG. 7D) or connected optical fibers. In another embodiment, the two PICs could be coupled to each other through free-space optical elements such as lenses or lens arrays. Optical isolators can be inserted between the lasers and the PIC 701b to suppress undesirable reflections to the lasers.

Figure 8A:
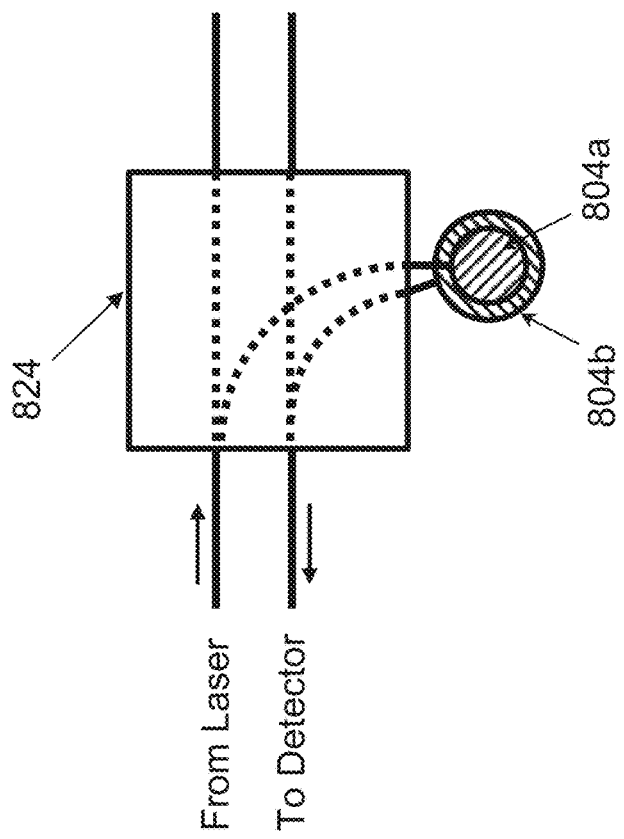
FIG. 8A shows an embodiment in which the Tx and Rx antennas are integrated side-by-side.
Figure 8B:
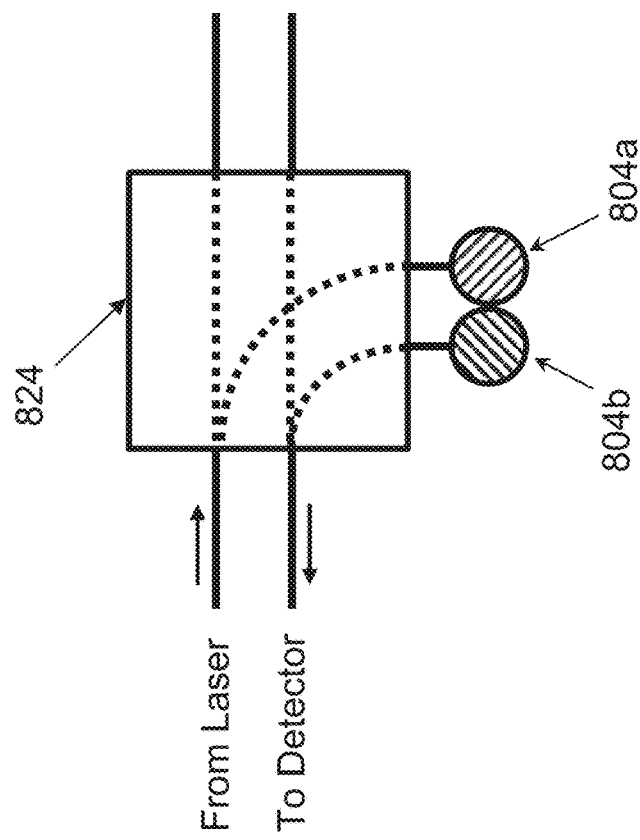
FIG. 8B shows an embodiment in which the Tx and Rx antennas are stacked vertically.

As described above, the transmit optical antenna and the receive optical antenna for each pixel can be offset either in the X/Y direction (side by side) or the Z direction (vertically stacked) to minimize the crosstalk between the Tx and Rx signals. The Tx antenna 604a and Rx antenna 604b can be either integrated side by side (FIG. 8A) or stacked vertically (FIG. 8B). Since the imaging LiDAR maps each lateral location in the focal plane to a different far field angle, there is a small offset between the Tx and Rx angles. This angle is sufficiently small and should still overlap on targets. To reduce the angular offset, the Tx and Rx antennas can be stacked vertically, as shown in FIG. 8B. In this embodiment, the Tx and Rx antennas are designed to operate with orthogonal polarizations. They are fabricated on different optical layers to minimize the crosstalk between the antennas.

Figure 9F:
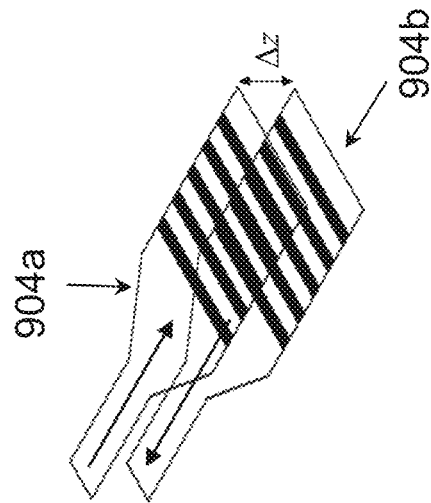
FIG. 9D-9F is an embodiment of vertically stacked antennas, where the two optical antennas are designed to operate in two orthogonal polarizations for Tx and Rx, respectively, in which the two antennas are aligned parallelly without the 90-degree rotation.
Figure 9D:
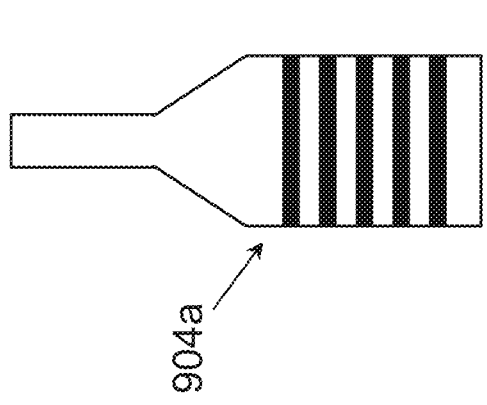
Figure 9E:
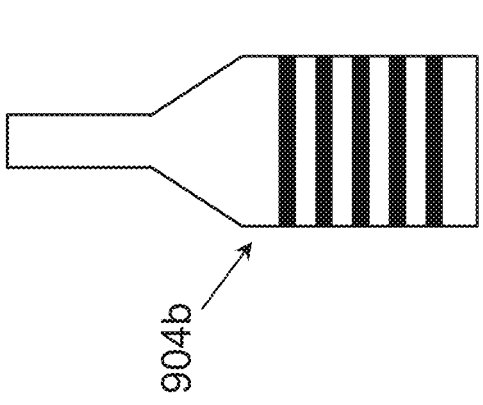

One embodiment of the vertically stacked antennas is shown in FIGS. 9A-9C. In this embodiment, each antenna is designed to operate in one polarization. As shown, the transmit optical antenna 904a is designed to operate in a first polarization, and the receive optical antenna is rotated by 90 degrees relative to the transmit optical antenna so it will transmit or receive in an orthogonal or second polarization. FIGS. 9A-9B shows the transmit and receive antennas separate, and FIG. 9C shows the antennas rotated orthogonally and vertically stacked on each other. The antennas are separated by a distance $\Delta z$ (on the order of micrometers) in the vertical direction (along the optical axis of the lens) to minimize the crosstalk between the antennas. In another embodiment of the vertically stacked antennas, the two optical antennas are designed to operate in two orthogonal polarizations for Tx and Rx, respectively, in which the two antennas are aligned parallelly without the 90-degree rotation (FIGS. 9D-9F).

Figure 10:
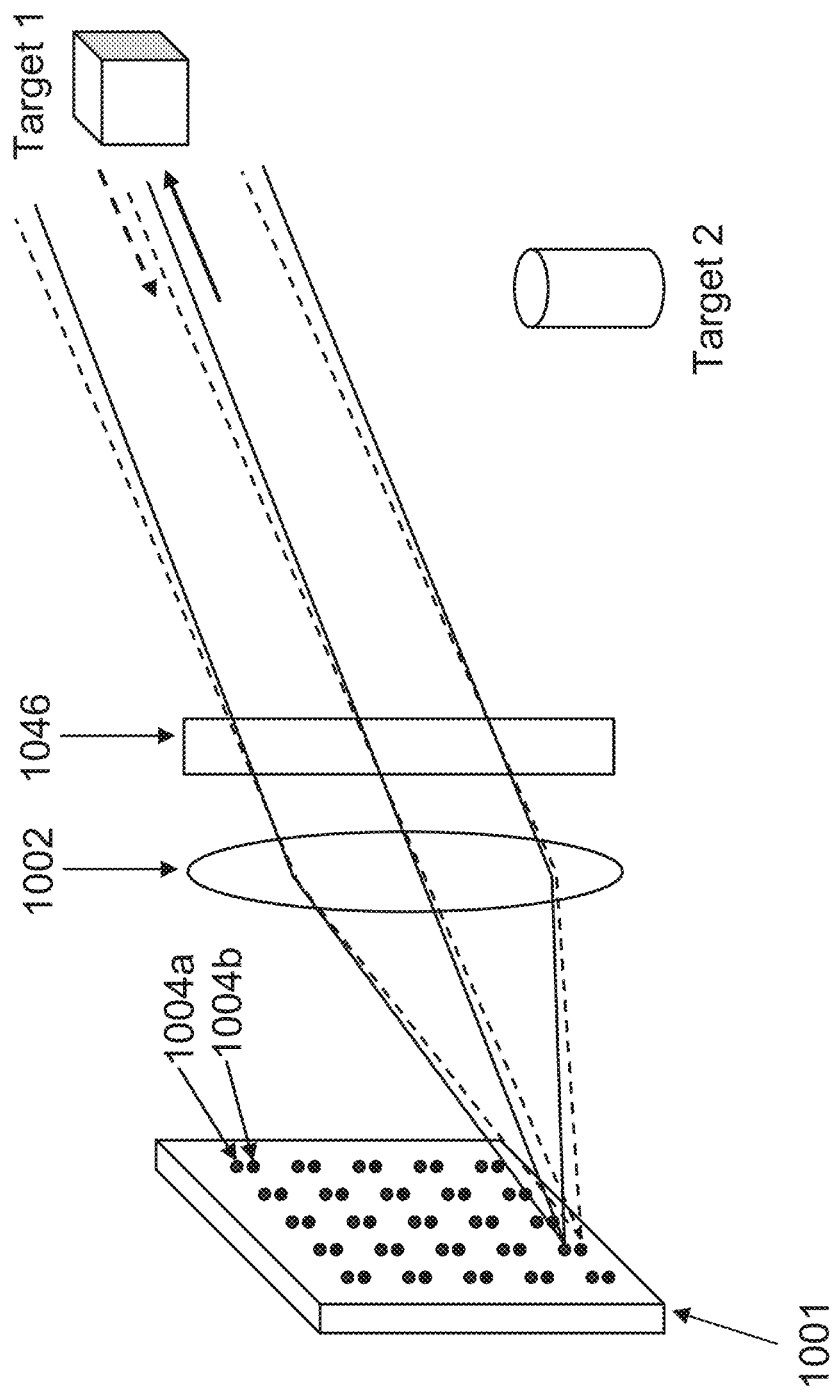
FIG. 10 illustrates one embodiment of the imaging LiDAR employs a quarter-wave plate between the antennas and the targets.

One embodiment of the imaging LiDAR employs a quarter-wave plate 1046 between the antennas (e.g., Tx antennas 1004*a* and Rx antennas 1004*b*) and the targets, as shown in FIG. 10. The quarter-wave plate can be inserted before or after the lens 1002. In this embodiment, the Tx and the Rx antennas have orthogonal polarizations. The emitted light pass through the quarter-wave plate. The reflected light from the target passes through the quarter-wave plate again before reaching the Rx antenna. The polarization is rotated by 90 degrees when reaching the Rx antenna. This embodiment has minimum optical losses in the optical path.

Yet another embodiment of the imaging LiDAR uses polarization-diversity receivers. Sometimes the light reflected from target is depolarized. A polarization-diversity receiver will be able to capture reflected light in both polarizations. In this embodiment, light emits in one polarization, but the Rx has two antennas, one with polarization parallel to that of the emitted light and the other with orthogonal polarization. The output of each antenna is mixed with an LO tapped off from the laser and detected by its own coherent receiver.

The systems and methods described herein can be used, for example, to perform range (distance) measurement in multiple directions. Additionally, the systems and methods described herein can be used to perform measurement of 3D point clouds. In some embodiments, the frame rate or speed of 3D point cloud measurement can be increased by turning on multiple pixels at the same time. In some examples, these multiple pixels can be powered by the same laser through an optical splitter. In other embodiments, the multiple pixels can be powered by separate lasers.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. A pseudo-monostatic imaging LiDAR system comprising:
   a lens;
   at least one light emitter;
   at least one light detector;
   a plurality of paired optical antennas each comprising a transmit optical antenna configured to transmit light towards a target through the lens and a receive optical antenna configured to receive light from the target through the lens; and
   a programmable optical network configured to provide a first light path from the at least one light emitter to a selected transmit optical antenna, the programmable optical network being further configured to provide a separate second light path from a receive optical antenna paired to the selected transmit optical antenna to the at least one light detector;
   wherein the plurality of paired optical antennas are positioned at or around a focal plane of the lens.

2. The system of claim 1 wherein the plurality of paired optical antennas and the programmable optical network are integrated on a photonic integrated circuit.

3. The system of claim 1 wherein the at least one light detector is shared by a plurality of pixels, each pixel comprising:
   the selected transmit optical antenna;
   the receive optical antenna paired to the selected transmit optical antenna;
   a dual-channel 1×2 optical switch comprising two parallel switches connecting an optical bus waveguide to the selected transmit optical antenna and a second optical bus waveguide connected to the receive optical antenna paired to the selected transmit optical antenna;
   wherein the programmable optical network is programmed to provide a light path from at least one light emitter to the selected transmit optical antenna and a physically separate light path from the receive optical antenna paired to the selected transmit optical antenna to the at least one light detector.

4. The system of claim 3 wherein a separate light emitter is used for each group of pixels.

5. The system of claim 2 wherein the at least one light emitter or the at least one light detector, or both, are integrated on the photonic integrated circuit.

6. The system of claim 2 where in the at least one light emitter or the at least one light detector, or both, are integrated on a separate second photonic integrated circuit and coupled to the photonic integrated circuit.

7. The system of claim 2 wherein the at least one light emitter or the at least one light detector, or both, are connected to the photonic integrated circuit by optical fibers, polymer waveguides, other type of waveguides, or coupled through free-space with optical elements consisting of lenses, grating couplers, and other free-space optical elements.

8. The system of claim 1 wherein the at least one light emitter is a frequency-modulated continuous-wave laser, and the at least one light detector is a coherent optical receiver comprising balanced photodetectors or in-phase/quadrature double balanced photodetectors, wherein a fraction of the at least one light emitter is tapped off by a 1×2 coupler to produce a local oscillator of the coherent receiver.

9. The system of claim 1 wherein the at least one light detector is integrated into a pixel, the pixel comprising:
   a 1×2 optical switching unit;
   a 1×2 coupler to split a fraction an output of the at least one light emitter to produce a local oscillator;
   a transmit optical antenna;
   a paired receive optical antenna; and a coherent receiver configured to receive optical signals from at least one receive optical antenna and the local oscillator.

10. The system of claim 3 wherein optical energy from the at least one light emitter is delivered to multiple selected pixels through an optical splitter or optical amplifier.

11. The system of claim 1 wherein the transmit optical antenna and the receive optical antenna of the plurality of paired optical antennas are side by side in the same optical layer.

12. The system of claim 1 wherein the transmit optical antenna and the receive optical antenna of the plurality of paired optical antennas are integrated vertically on separate optical layers.

13. The system of claim 1 wherein the transmit optical antenna and the receive optical antenna of the plurality of paired optical antennas have orthogonal polarizations, and wherein the system further comprises a quarter-wave plate disposed before or after the optical lens.

14. The system of claim 1 wherein each receive optical antenna of the plurality of paired optical antennas comprise two antennas with orthogonal polarizations and are configured to detect reflected optical signals in both of the orthogonal polarizations.

15. The system of claim 1 wherein the programmable optical network is controlled by one or more micro-electro-mechanical system (MEMS) actuators, or Mach-Zehnder interferometers with electro-optic or thermo-optic phase modulators, or microring resonators with electro-optic or thermo-optic phase modulators.

16. A method of performing LiDAR imaging, comprising the steps of:
controlling a programmable optical network to provide a first light path from at least one light emitter to a selected transmit optical antenna of a paired optical antenna of the optical network;
transmitting light from the selected transmit optical antenna through a lens in the direction of a target;
receiving light with a receive optical antenna that is paired to the selected transmit optical antenna from the target through the lens; and
controlling the programmable optical network to provide a separate second light path from the receive optical antenna to at least one light detector.

17. The method of claim 16, wherein controlling the programmable optical network comprises actuating one or more MEMS switches.

18. The method of claim 17, wherein actuating the one or more MEMS switches further comprises energizing one or more electrodes disposed within the one or more MEMS switches.

19. The method of claim 16, further comprising delivering optical energy from the at least one light emitter to multiple selected pixels through an optical splitter.

20. The method of claim 16, where three-dimensional images are acquired by combining the range measurements of multiple pixels.

21. A pseudo-monostatic imaging LiDAR system comprising:
a lens;
at least one light emitter;
at least one light detector;
a plurality of paired optical antennas each comprising a transmit optical antenna configured to transmit light towards a target through the lens and a receive optical antenna configured to receive light from the target through the lens, wherein each transmit optical antenna and the receive optical antenna of the plurality of paired optical antennas are integrated vertically on separate optical layers; and
a programmable optical network configured to provide a first light path from the at least one light emitter to a selected transmit optical antenna, the programmable optical network being further configured to provide a separate second light path from a receive optical antenna paired to the selected transmit optical antenna to the at least one light detector;
wherein the plurality of paired optical antennas are positioned at or around a focal plane of the lens.

* * * * *